US012604314B2

(12) United States Patent
Hao et al.

(10) Patent No.: US 12,604,314 B2
(45) Date of Patent: Apr. 14, 2026

(54) CHANNEL STATE INFORMATION (CSI) PROCESSING FOR UE INITIATED CSI AND DOWNLINK GRANT CSI

(71) Applicant: QUALCOMM Incorporated, San Diego, CA (US)

(72) Inventors: Chenxi Hao, Beijing (CN); Yu Zhang, San Diego, CA (US); Chao Wei, Beijing (CN); Fang Yuan, Beijing (CN); Liangming Wu, Beijing (CN); Qiaoyu Li, Beijing (CN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 18/003,674

(22) PCT Filed: Aug. 13, 2021

(86) PCT No.: PCT/CN2021/112407
§ 371 (c)(1),
(2) Date: Dec. 28, 2022

(87) PCT Pub. No.: WO2022/033572
PCT Pub. Date: Feb. 17, 2022

(65) Prior Publication Data
US 2023/0247631 A1 Aug. 3, 2023

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0051* (2013.01); *H04L 5/0057* (2013.01); *H04W 24/08* (2013.01)

(58) Field of Classification Search
CPC .... H04W 24/08; H04L 1/1812; H04L 5/0051; H04L 5/0057
See application file for complete search history.

(56) References Cited

U.S. PATENT DOCUMENTS

2013/0235756 A1      9/2013   Seo et al.
2015/0327247 A1*   11/2015   Chen ..................... H04W 72/23
                                                        370/329
(Continued)

FOREIGN PATENT DOCUMENTS

CN          110249574  A        9/2019
CN          111316580  A        6/2020
(Continued)

OTHER PUBLICATIONS

International Search Report and Written Opinion—PCT/CN2020/109129—ISA/EPO—May 12, 2021.
(Continued)

*Primary Examiner* — Kent Krueger
(74) *Attorney, Agent, or Firm* — Arent Fox LLP /Qualcomm Incorporated

(57) ABSTRACT

This disclosure provides systems, methods and apparatus, including computer programs encoded on computer storage media, for transmitting a channel state information (CSI) report from a user equipment (UE). The CSI report may be a UE initiated CSI report or may be based on a downlink grant. The UE may receive a downlink grant scheduling a physical downlink shared channel (PDSCH) and a demodulation reference signal (DMRS). The UE may determine to report a CSI in response to a measurement of a downlink measurement resource or in response to the downlink grant requesting the CSI. The UE may determine a reserved uplink resource on which to report the CSI. The UE may transmit a CSI report on the reserved uplink resource.

30 Claims, 19 Drawing Sheets w/o A-CSI request

|← Frame n-1 →|

UE initiated CSI feedback (DMRS/CSI-RS based):
Measure CSI via DMRS/PDSCH, decide to report CSI if the MCS and rank of scheduled PDSCH is outdated compared to the measured CSI

(51) Int. Cl.
 *H04L 5/00* (2006.01)
 *H04W 24/08* (2009.01)

(56) References Cited

U.S. PATENT DOCUMENTS

| 2017/0013641 | A1 | 1/2017 | Patel et al. | |
| 2018/0020378 | A1* | 1/2018 | Tsuboi | H04L 1/203 |
| 2019/0349046 | A1* | 11/2019 | Liu | H04B 7/063 |
| 2020/0008235 | A1* | 1/2020 | Sarkis | H04W 72/21 |
| 2020/0162134 | A1* | 5/2020 | Kakishima | H04W 72/04 |
| 2020/0252951 | A1* | 8/2020 | Frenne | H04L 5/0023 |
| 2023/0247623 | A1* | 8/2023 | Hao | H04W 72/02 |
| | | | | 370/329 |
| 2023/0254086 | A1* | 8/2023 | Hao | H04L 5/0051 |
| | | | | 370/329 |

FOREIGN PATENT DOCUMENTS

| CN | 111418175 A | 7/2020 |
| CN | 111418179 A | 7/2020 |
| CN | 111436128 A | 7/2020 |
| EP | 2919506 A1 | 9/2015 |

OTHER PUBLICATIONS

International Search Report and Written Opinion—PCT/CN2021/112407—ISA/EPO—Nov. 11, 2021.
ITRI: "CSI Reporting for sTTI Operation," 3GPP TSG RAN WG1 Meeting #90bis, R1-1718073, Prague, CZ, Oct. 9-13, 2017, (Oct. 13, 2017), sections 1-3, 3 pages.

* cited by examiner

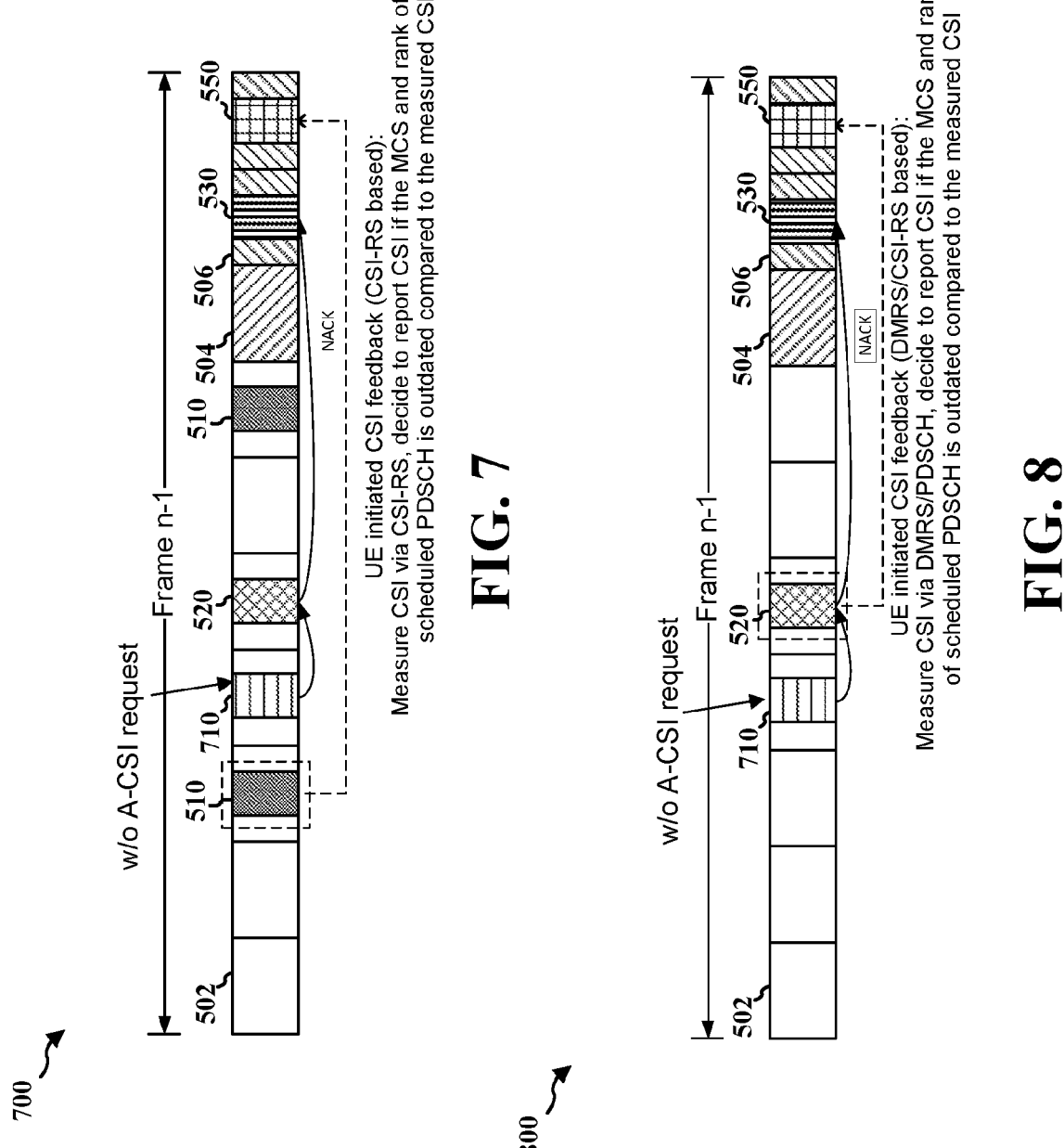

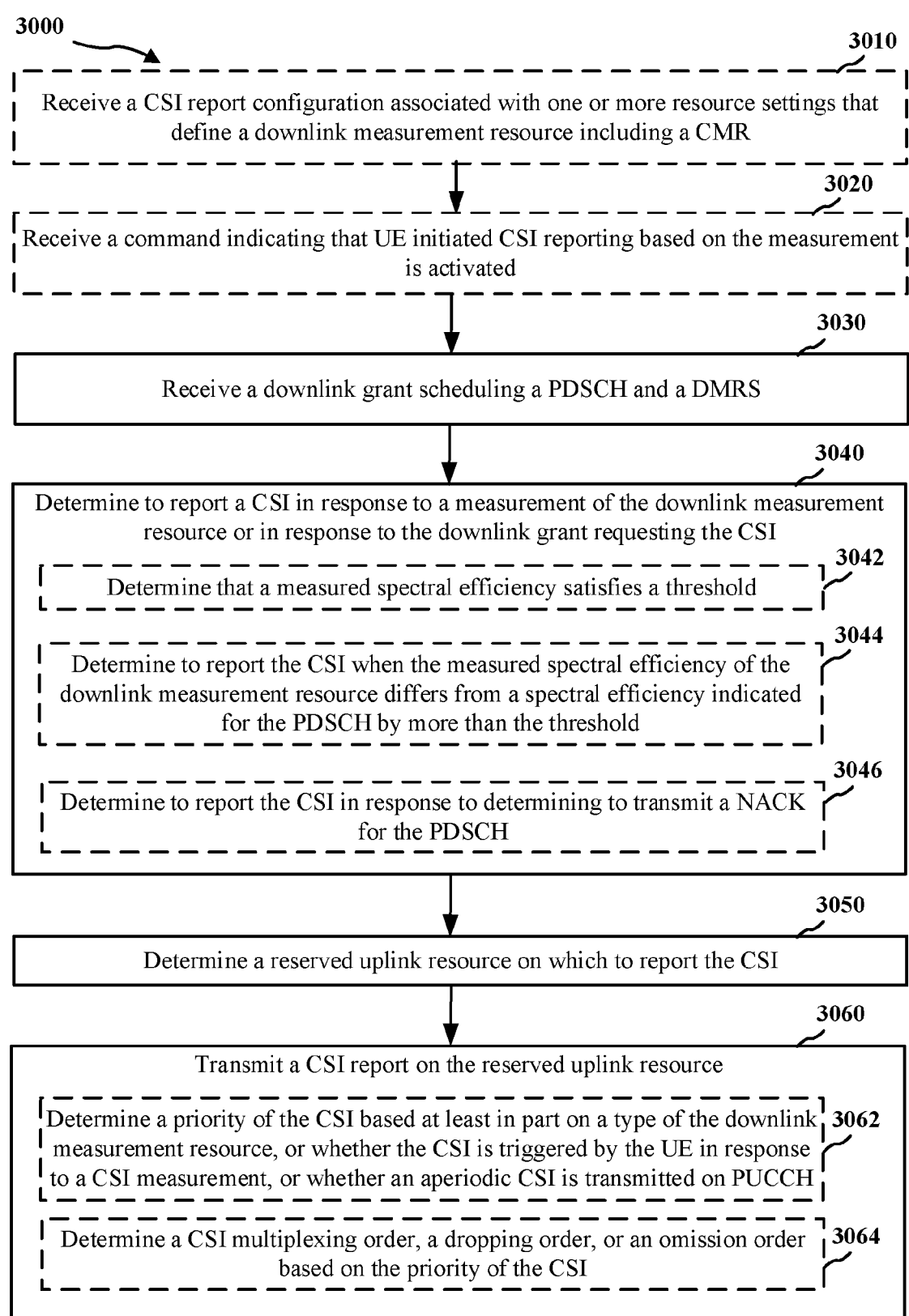

3000

3010

Receive a CSI report configuration associated with one or more resource settings that define a downlink measurement resource including a CMR

3020

Receive a command indicating that UE initiated CSI reporting based on the measurement is activated

3030

Receive a downlink grant scheduling a PDSCH and a DMRS

3040

Determine to report a CSI in response to a measurement of the downlink measurement resource or in response to the downlink grant requesting the CSI

3042

Determine that a measured spectral efficiency satisfies a threshold

3044

Determine to report the CSI when the measured spectral efficiency of the downlink measurement resource differs from a spectral efficiency indicated for the PDSCH by more than the threshold

3046

Determine to report the CSI in response to determining to transmit a NACK for the PDSCH

3050

Determine a reserved uplink resource on which to report the CSI

3060

Transmit a CSI report on the reserved uplink resource

3062

Determine a priority of the CSI based at least in part on a type of the downlink measurement resource, or whether the CSI is triggered by the UE in response to a CSI measurement, or whether an aperiodic CSI is transmitted on PUCCH

3064

Determine a CSI multiplexing order, a dropping order, or an omission order based on the priority of the CSI

FIG. 30

CHANNEL STATE INFORMATION (CSI) PROCESSING FOR UE INITIATED CSI AND DOWNLINK GRANT CSI

CROSS REFERENCE TO RELATED APPLICATIONS

This application is a National Phase entry of PCT Application No. PCT/CN2021/112407, entitled "CHANNEL STATE INFORMATION (CSI) PROCESSING FOR UE INITIATED CSI AND DOWNLINK GRANT CSI" and filed on Aug. 13, 2021, which claims priority to PCT Application No. PCT/CN2020/109129, entitled "CHANNEL STATE INFORMATION (CSI) PROCESSING FOR UE INITIATED CSI AND DOWNLINK GRANT CSI," and filed on Aug. 14, 2020, both of which are assigned to the assignee hereof, and expressly incorporated herein by reference in their entirety.

TECHNICAL FIELD

The present disclosure relates to user equipment (UE) channel state information (CSI) processing for UE initiated CSI and downlink grant CSI.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE).

The method may include receiving a downlink grant scheduling a physical downlink shared channel (PDSCH) and a demodulation reference signal (DMRS). The method may include determining to report a channel state information (CSI) in response to a measurement of a downlink measurement resource or in response to the downlink grant requesting the CSI. The method may include determining a reserved uplink resource on which to report the CSI. The method may include transmitting a CSI report on the reserved uplink resource.

In some implementations, determining to report the CSI in response to the measurement includes determining that a measured spectral efficiency satisfies a threshold.

In some implementations, determining that the measured spectral efficiency satisfies the threshold includes determining to report the CSI when the measured spectral efficiency of the downlink measurement resource differs from a spectral efficiency indicated for the PDSCH by more than the threshold.

In some implementations, the measured spectral efficiency is one of a channel quality indicator (CQI) or a measured feasible modulation and coding scheme (MCS).

In some implementations, the spectral efficiency is also based on a transmission rank, a precoding matrix index, or a combination thereof.

In some implementations, the method further includes receiving a command indicating that UE initiated CSI reporting based on the measurement is activated.

In some implementations, the command is a media access control (MAC) control element (CE).

In some implementations, the UE initiated CSI reporting based on the measurement remains active until a deactivation command is received.

In some implementations, the UE initiated CSI reporting based on the measurement remains active for a number of CSI transmission opportunities.

In some implementations, the method further includes receiving a CSI report configuration associated with one or more resource settings that define the downlink measurement resource including a channel measurement resource (CMR). The CMR is either a NZP-CSI-RS resource setting or a DMRS or PDSCH (DMRS/PDSCH) resource setting.

In some implementations, the downlink measurement resource includes one or more interference measurement resources (IMR) selected from the group consisting of: a DMRS/PDSCH resource, a non-zero power (NZP) CSI reference signal (NZP-CSI-RS), and a CSI-RS resource for interference measurement (CSI-IM).

In some implementations, the IMR is the DMRS/PDSCH resource and the interference is the measurement from DMRS resource elements (REs) or PDSCH REs other than a channel on which a set of DMRS ports for the PDSCH is conveyed or a channel on which the PDSCH is conveyed.

In some implementations, the CSI report configuration defines a reserved uplink resource per CMR or per hybrid automatic repeat request (HARQ) process number.

In some implementations, the CSI report configuration defines an uplink resource for each of the one or more resource settings.

In some implementations, the CSI report configuration is associated with a single DMRS/PDSCH CMR or single HARQ process number.

In some implementations, the CSI report includes a HARQ process number of the PDSCH.

In some implementations, the downlink measurement resource is the DMRS and the CSI report includes a channel quality indicator (CQI).

In some implementations, the CQI is a single bit indicating whether a feasible CQI or MCS is less than an indicated MCS for the PDSCH by more than a threshold.

In some implementations, the CQI is a single bit, where a first codepoint of the single bit indicates that a feasible CQI or MCS is less than an indicated MCS for the PDSCH by more than a threshold and a second codepoint of the single bit indicates that the feasible CQI or MCS is greater than the indicated MCS by more than the threshold.

In some implementations, the CQI indicates a 4-bit CQI value or a 2-bit CQI differential relative to an indicated MCS for the PDSCH.

In some implementations, the CSI report includes a rank indicator and a value of the CQI is based on the rank indicator.

In some implementations, the CSI report includes a measurement resource indicator, precoding matrix indicator (PMI), rank indicator (RI), channel quality indicator (CQI), or combination thereof configured for the CSI report configuration.

In some implementations, the reserved uplink resource includes a physical uplink control channel (PUCCH) resource or a physical uplink shared channel (PUSCH) resource selected from a list of reserved PUSCH resources or PUCCH resources configured by a radio resource control (RRC) message, and wherein the selection is determined based on an indication received in downlink control information (DCI) or a RRC message or based on a report ID, resource ID, or HARQ process number.

In some implementations, the reserved uplink resource includes a dedicated scheduling request (SR) resource according to a periodicity and offset.

In some implementations, the reserved uplink resource further includes a PUCCH resource defined by an offset from the dedicated SR.

In some implementations, the reserved uplink resource is a dedicated two-step random access resource, wherein the CSI is carried in a msgA payload on a physical uplink PUSCH.

In some implementations, determining to report the CSI is also in response to determining to transmit a negative acknowledgment (NACK) for the PDSCH.

In some implementations, the downlink measurement resource is the DMRS, the PDSCH, or a combination thereof and a reference resource for CQI reporting is a slot in which the DMRS or the PDSCH is received.

In some implementations, a CSI processing unit (CPU) occupation time starts from a first symbol of an earliest of the DMRS or the PDSCH used for channel measurement or an interference measurement resource and ends at a last symbol of the reserved uplink resource.

In some implementations, a DMRS port for the DMRS and the PDSCH is active from a first symbol of the DMRS or the PDSCH used for channel measurement or interference measurement to a last symbol of the reserved uplink resource.

In some implementations, the reserved uplink resource is separated from a last symbol of the downlink measurement resource by at least a number of symbols defined by a CSI timeline, wherein the CSI timeline is selected based at least in part on a number of CPU occupation or a number of a DMRS port.

In some implementations, the reserved uplink resource is separated from a last symbol of the downlink measurement resource by a greater of the number of symbols defined by the CSI timeline or a number of symbols defined by a HARQ timeline when the CSI is transmitted on a same slot as a HARQ ACK/NACK or in a same PUCCH as the HARQ ACK/NACK.

In some implementations, transmitting the CSI report on the reserved uplink resource includes: determining a priority of the CSI based at least in part on a type of the downlink measurement resource, whether the CSI is triggered by the UE in response to a CSI measurement, or whether an aperiodic CSI is transmitted on a physical uplink control channel (PUCCH); and determining a CSI multiplexing order, a dropping order, or an omission order based on the priority of the CSI.

Other innovative aspects of the subject matter described in this disclosure can be implemented as an apparatus (e.g., a UE) including a memory storing computer executable instructions and a processor configured to execute the instructions to perform any of the above methods, an apparatus including means for performing any of the above methods, and a non-transitory computer-readable medium storing computer executable instructions for performing any of the above methods.

One innovative aspect of the subject matter described in this disclosure can be implemented in a method of wireless communication at an apparatus of a base station (BS). The method may include configuring a UE with a channel state information (CSI) report configuration including a downlink measurement resource and an associated reserved uplink resource. The method may include transmitting a downlink grant that schedules a physical downlink shared channel (PDSCH) and a demodulation reference signal (DMRS). The method may include receiving a CSI report on the reserved uplink resource.

In some implementations, the CSI report is in response to a measured spectral efficiency of the downlink measurement resource satisfying a threshold.

In some implementations, the measured spectral efficiency of the downlink measurement resource differs from a spectral efficiency indicated for the PDSCH by more than the threshold.

In some implementations, the measured spectral efficiency is one of a channel quality indicator (CQI) or a measured feasible modulation and coding scheme (MCS).

In some implementations, the spectral efficiency is also based on a transmission rank, a precoding matrix index, or a combination thereof.

In some implementations, the method further includes transmitting a command indicating that UE initiated CSI reporting based on a measurement of the downlink measurement resource is activated.

In some implementations, the command is a media access control (MAC) control element (CE).

In some implementations, the UE initiated CSI reporting based on the measurement remains active until a deactivation command is received.

In some implementations, the UE initiated CSI reporting based on the measurement remains active for a number of CSI transmission opportunities.

In some implementations, the CSI report configuration is associated with one or more resource settings that define the downlink measurement resource including a channel measurement resource (CMR), wherein the CMR is either a NZP-CSI-RS resource setting or a DMRS or PDSCH (DMRS/PDSCH) resource.

In some implementations, the downlink measurement resource includes one or more interference measurement resources (IMR) selected from the group consisting of: a DMRS/PDSCH resource, a non-zero power (NZP) CSI reference signal (NZP-CSI-RS), and a CSI-RS resource for interference measurement (CSI-IM).

In some implementations, the IMR is the DMRS/PDSCH resource and the interference is a measurement from DMRS resource elements (REs) other than a channel on which a set of DMRS ports for the PDSCH are conveyed.

In some implementations, the CSI report configuration defines a reserved uplink resource per CMR or per hybrid automatic repeat request (HARQ) process number.

In some implementations, the CSI report configuration defines an uplink resource for each of the one or more resource settings.

In some implementations, the CSI report configuration is associated with a single DMRS/PDSCH CMR or single HARQ process number.

In some implementations, the CSI report includes a HARQ process number of the PDSCH.

In some implementations, the downlink measurement resource is the DMRS and the CSI report includes a channel quality indicator (CQI).

In some implementations, the CQI is a single bit indicating whether a feasible CQI or feasible MCS is less than an indicated MCS for the PDSCH by more than a threshold.

In some implementations, the CQI is a single bit, where a first codepoint of the single bit indicates that a feasible CQI or MCS is less than an indicated MCS for the PDSCH by more than a threshold and a second codepoint of the single bit indicates that the feasible CQI or MCS is greater than the indicated MCS by more than the threshold.

In some implementations, the CQI indicates a 4-bit CQI value or a 2-bit CQI differential relative to an indicated MCS for the PDSCH.

In some implementations, the CSI report includes a rank indicator and a value of the CQI is based on the rank indicator.

In some implementations, the CSI report includes a measurement resource indicator, precoding matrix indicator (PMI), rank indicator (RI), channel quality indicator (CQI) or combination thereof configured for the CSI report configuration.

In some implementations, the reserved uplink resource includes a physical uplink control channel (PUCCH) resource or a physical uplink shared channel (PUSCH) resource selected from a list of reserved PUSCH resources or PUCCH resources configured by a radio resource control (RRC) message. The selection is determined based on an indication received in downlink control information (DCI) or a RRC message or based on a report ID, resource ID, or HARQ process number.

In some implementations, the reserved uplink resource includes a dedicated scheduling request (SR) resource according to a periodicity and offset.

In some implementations, the reserved uplink resource further includes a PUCCH resource defined by an offset from the dedicated SR.

In some implementations, the reserved uplink resource is a dedicated two-step random access resource, wherein the CSI is carried in a msgA payload on a physical uplink PUSCH.

In some implementations, determining to report the CSI is also in response to determining to transmit a negative acknowledgment (NACK) for the PDSCH.

In some implementations, the downlink measurement resource is the DMRS, the PDSCH, or a combination thereof and a reference resource for CQI reporting is a slot in which the DMRS or the PDSCH is received.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 is a diagram illustrating an example CSI reporting timeline for UE initiated CSI reporting based on a CSI reference signal (CSI-RS).

FIG. 8 is a diagram illustrating an example CSI reporting timeline for UE initiated CSI reporting based on a physical downlink shared channel (PDSCH) or a demodulation reference signal (DMRS) (PDSCH/DMRS).

FIG. 30 is a flowchart of an example method for a UE to transmit a CSI report based on UE initiated CSI or a downlink grant based CSI.

Like reference numbers and designations in the various drawings indicate like elements.

DETAILED DESCRIPTION

Figure 1:
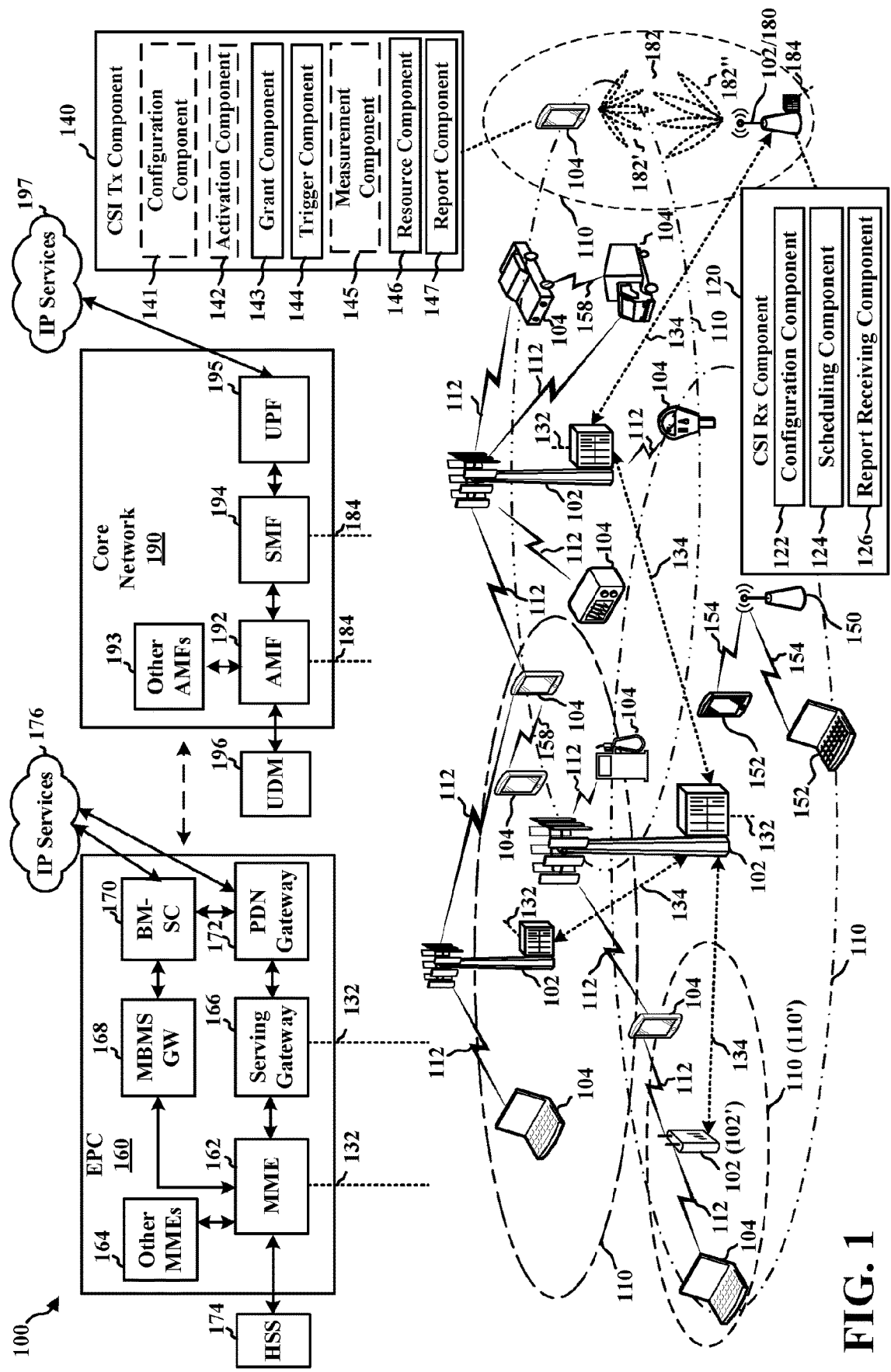
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (JOT) network, such as a system utilizing 3G, 4G or 5G, or further implementations thereof, technology.

A user equipment (UE) may transmit a channel state information (CSI) report to inform a base station about channel conditions. Conventionally, the UE determines the CSI based on a CSI reference signal (CSI-RS) transmitted by the base station and transmits the CSI report on either a physical uplink control channel (PUCCH) or a physical uplink shared channel (PUSCH). The UE may be configured to transmit a periodic CSI and/or an aperiodic CSI. For the aperiodic CSI, the base station may transmit an uplink grant that provides the PUSCH resource for the CSI report. Conventional CSI reporting techniques may have limitations with respect to a feedback delay and overhead. In particular, although the network may trigger aperiodic CSI to obtain a CSI report in response to a failed transmission (e.g., a negative acknowledgment (NACK) for a physical downlink shared channel (PDSCH)), there may be a delay of at least one frame before the base station is able to schedule the aperiodic CSI and receive the CSI report. Additionally, the use of the CSI-RS may contribute to channel overhead.

In an aspect, the present disclosure provides for UE initiated CSI reporting and downlink grant based CSI reporting. For UE initiated CSI reporting, the UE may autonomously determine to transmit a CSI report based on a measurement. For downlink grant based CSI reporting, the base station may transmit a downlink grant that requests a CSI report. Both UE initiated CSI reporting and downlink grant based CSI reporting may utilize the PDSCH and associated demodulation reference signal (DMRS) as a measurement resource, although the CSI-RS may alternatively be used as the measurement resource. Both UE initiated CSI reporting and downlink grant based CSI reporting may utilize a dedicated uplink resource for the CSI report.

Particular implementations of the subject matter described in this disclosure can be implemented to realize one or more of the following potential advantages. A UE may use UE initiated CSI reporting or downlink grant based CSI reporting to increase flexibility in CSI reporting and reduce delay in adapting to changing channel conditions. For example, when the UE fails to decode a PDSCH, the UE may transmit a CSI report based on the PDSCH and associated DMRS as the measurement resource. In some cases, the CSI report may be transmitted in the same frame as the PDSCH. Accordingly, the base station may be able to adapt a subsequent PDSCH transmission based on the HARQ-ACK, thereby improving error rate and throughput. In some implementations, the use of the PDSCH/DMRS as the measurement resource may avoid using CSI-RS, thus reducing downlink signal overhead. In some cases, rate adaptation based on HARQ-ACK may not be efficient due to following reasons: 1) there may not be sufficient UL slots for UE to transmit ACK/NACK in TDD system, and 2) ACK/NACK is 1-bit, so the BS may not have high resolution information to assist rate adaptation. From these aspects, BS may not be aware that the CSI becomes outdated or inaccurate, so the BS may not trigger CSI reporting in time. Even though BS is aware of the CSI inaccuracy, BS needs to send the request and there will be several slots for UE processing CSI and reporting the CSI. So the overall timeline from reporting a NACK, to BS awareness of inaccurate CSI, to obtaining the CSI reporting may be as long as tens of slots. However, UE initiated CSI feedback may allow the UE to take the action of processing the CSI based on the DMRS/PDSCH or CSI-RS and reporting the CSI timely so as shorten the overall timeline for obtaining CSI. Moreover, downlink grant triggered CSI may provide more flexibility to the BS rather only using UL grant to trigger CSI reporting. It may also enable DMRS/PDSCH based on CSI measurement and reporting, which saves CSI-RS overhead and may shorten the overall CSI acquisition timeline.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

In some implementations, one or more of the UEs 104 may include a CSI transmit (Tx) component 140 that transmits a CSI report using UE initiated CSI reporting or downlink grant based CSI reporting. The CSI Tx component 140 may include a grant component 143 that is configured to receive a downlink grant scheduling a PDSCH and a DMRS, a trigger component 144 that is configured to determine to report a CSI in response to a measurement of a downlink measurement resource or in response to the downlink grant requesting the CSI, a resource component 146 configured to determine a reserved uplink resource on which to report the CSI, and a report component 147 configured to transmit a CSI report on the reserved uplink resource. The CSI Tx component 140 may optionally include a configuration component 141 that is configured to receive a CSI report configuration associated with one or more resource settings that define the downlink measurement resource including a channel measurement resource (CMR). The CSI Tx component 140 may optionally include an activation component 142 configured to receive a command indicating that UE initiated CSI reporting based on the measurement is activated. The CSI Tx component 140 may optionally include a measurement component 145 configured to perform channel measurements and determine the CSI based on the PDSCH/DMRS or the CSI-RS.

In some implementations, one or more of the base stations 102 may include a CSI receive (Rx) component 120 that receives a UE initiated CSI report or a downlink grant based CSI report from a UE. The CSI Rx component 120 may include configuration component 122, a scheduling component 124, and a report receiving component 126. The configuration component 122 may be configured to configure a UE with a CSI report configuration including a downlink measurement resource and an associated reserved uplink resource. The scheduling component 124 may be configured to transmit a downlink grant that schedules a PDSCH and a DMRS. The report receiving component 126 may be configured to receive a CSI report on the reserved uplink resource.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
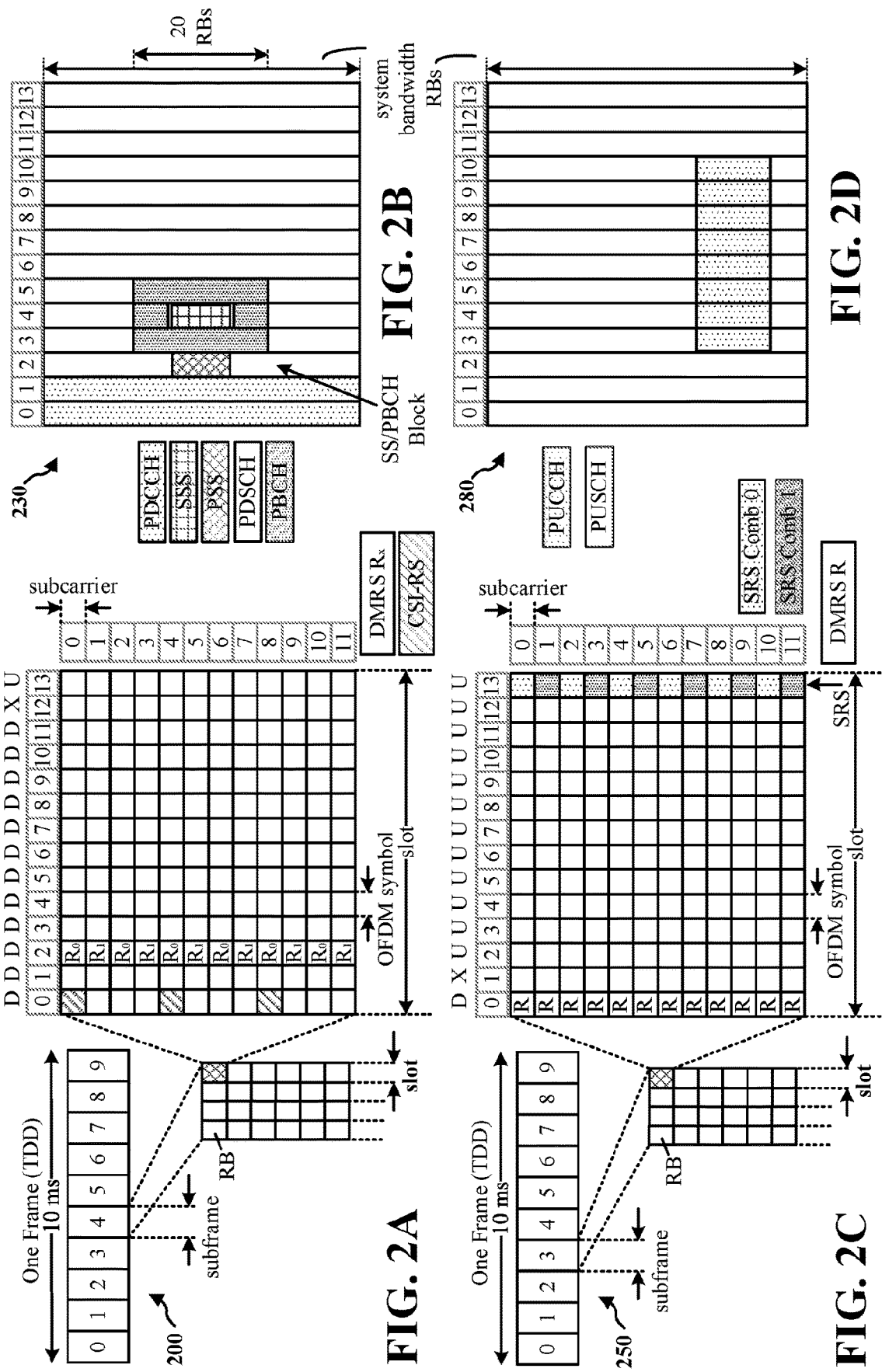
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
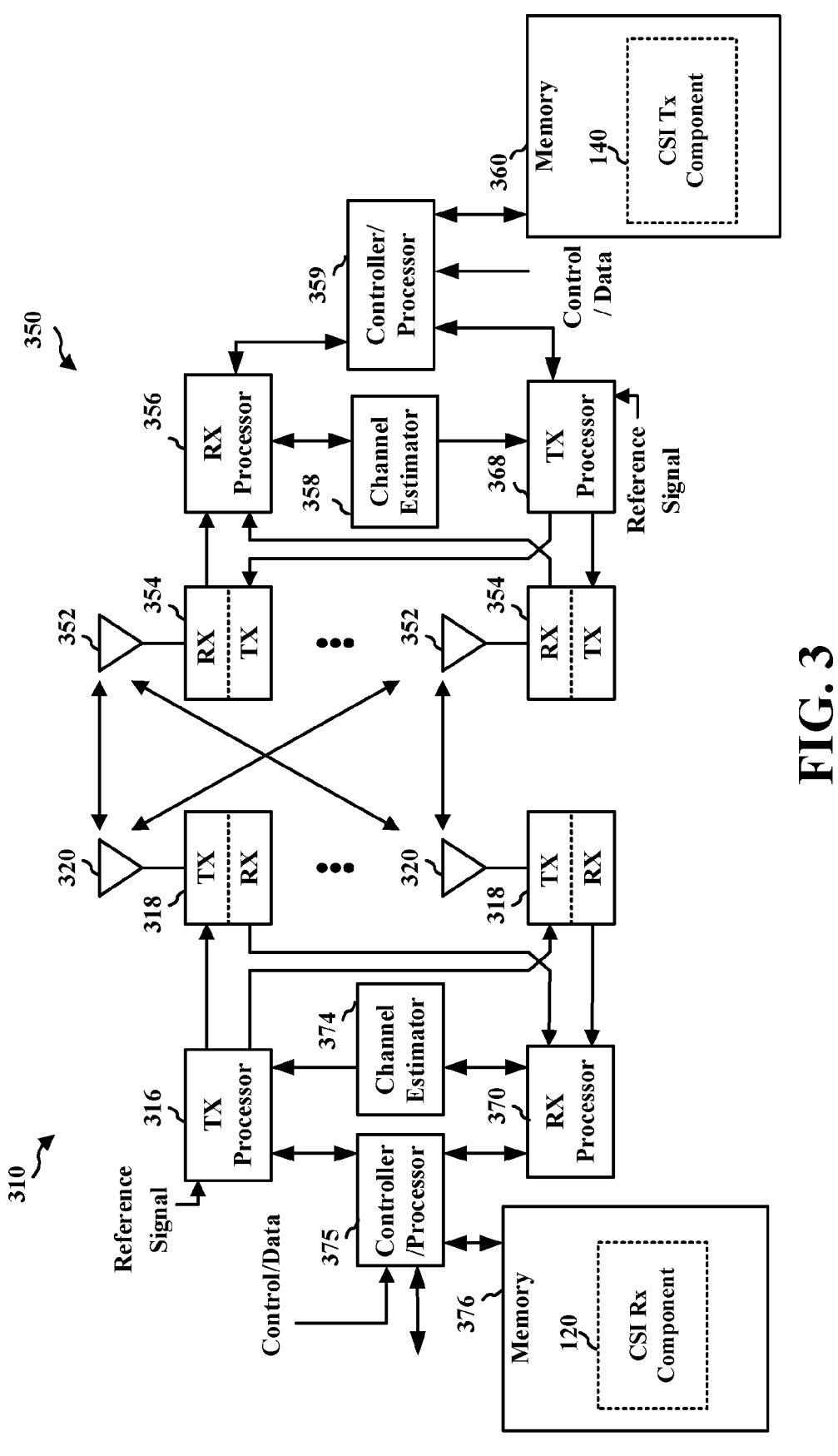
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter (illustrated as TX within transceiver 318). Each transmitter may modulate an RF carrier with a respective spatial stream for transmission.

At the UE 350, each receiver (illustrated as RX within transceiver 354) receives a signal through its respective antenna 352. Each receiver recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters (illustrated as TX within transceiver 354). Each transmitter may modulate an RF carrier with a respective spatial stream for transmission.

The UL transmission is processed at the base station 310 in a manner similar to that described in connection with the receiver function at the UE 350. Each receiver (illustrated as RX within transceiver 318) receives a signal through its respective antenna 320. Each receiver recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the CSI Tx component 140 of FIG. 1. For example, the memory 360 may include executable instructions defining the CSI Tx component 140. The TX processor 368, the RX processor 356, and/or the controller/processor 359 may be configured to execute the CSI Tx component 140.

At least one of the TX processor 316, the RX processor 370, and the controller/processor 375 may be configured to perform aspects in connection with the CSI Rx component 120 of FIG. 1. For example, the memory 376 may include executable instructions defining the CSI Rx component 120. The TX processor 316, the RX processor 370, and/or the controller/processor 375 may be configured to execute the CSI Rx component 120.

Figure 4:
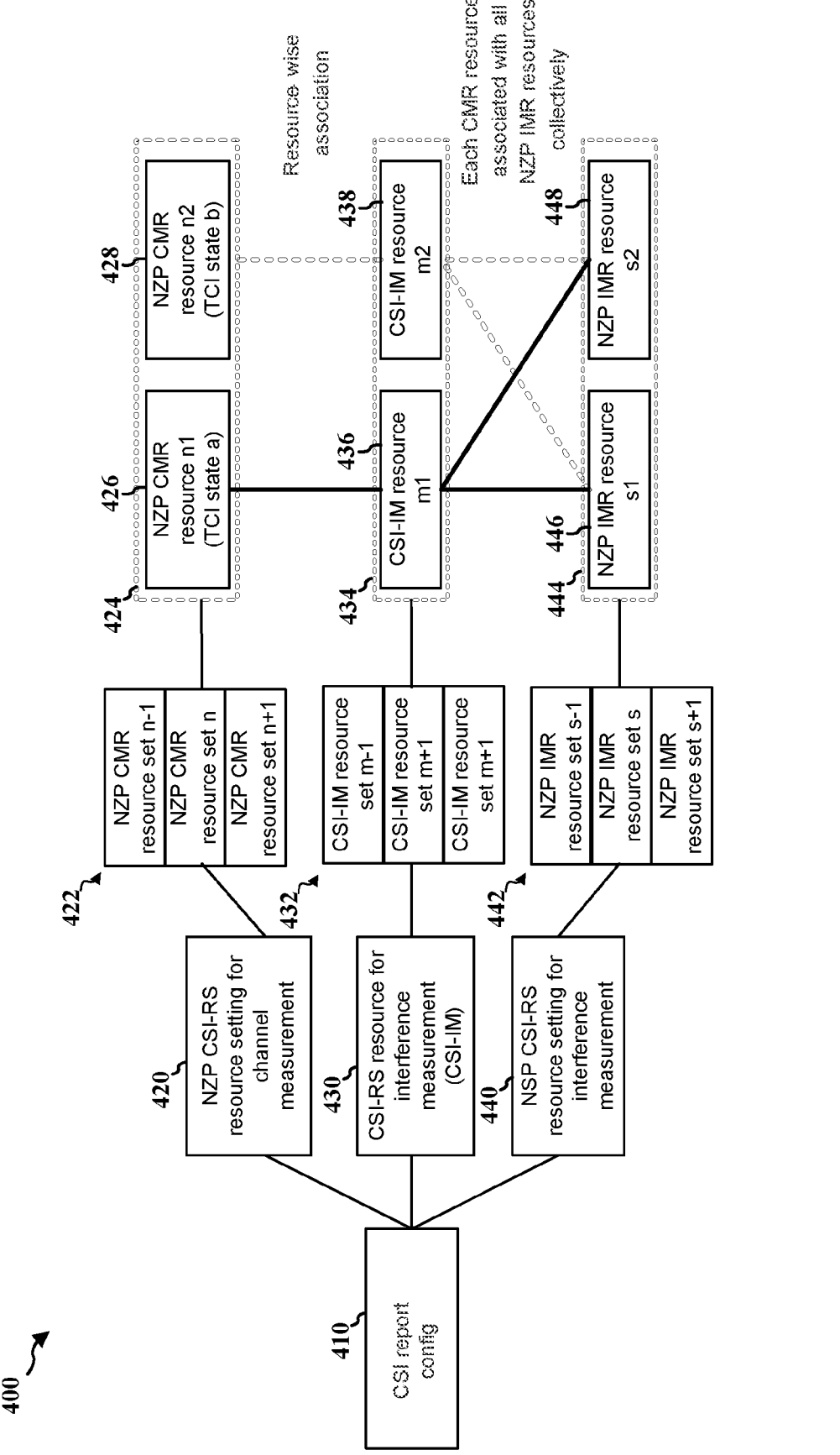
FIG. 4 is a diagram illustrating an example configuration of channel state information (CSI) resources.

FIG. 4 is a diagram 400 illustrating an example configuration of CSI resources. A UE 104 may be configured with CSI reporting configurations via RRC signaling. For example, for aperiodic CSI, the UE 104 may be configured with up to 128 trigger states per serving cell, each trigger state including one or more CSI report configurations. In each trigger state, there may be one active resource set from multiple resource sets for each CSI report configuration. A media access control (MAC) control element (CE) may down select 64 active trigger states from the 128 configured trigger states. A downlink control information (DCI) may trigger 1 trigger state from the 64 active trigger states using a 6-bit CSI request in an uplink related DCI such as DCI format 0_1.

A CSI report configuration 410 may include 1 non-zero-power CSI-RS (NZP-CSI-RS) resource setting for channel measurement (CMR) 420. The CSI report configuration 410 may include between 0 and 2 resource settings for interference measurement (IMR). For example, if 1 resource setting IMR is configured, the IMR may be a CSI-RS resource for interference measurement (CSI-IM) setting 430 or a NZP-CSI-RS setting 440. If 2 resource setting IMRs are configured, the IMRs should be the CSI-IM setting 430 and NZP-CSI-RS setting 440.

Each resource setting may be associated with one or more resource sets. For example, the CMR 420 may be associated with NZP CMR resource sets 422, the CSI-IM 430 may be associated with CSI-IM resource sets 432, and the NZP IMR 440 may be associated with NZP IMR resource sets 442. Each resource set may include one or more resources. For example, the NZP CMR resource set 424 may include a NZP CMR resource n1 426 (e.g., a first transmission configuration indicator (TCI) state) and NZP CMR resource n2 428 (e.g., a second TCI state). Similarly, the CSI-IM resource set 434 may include a CSI-IM resource m1 436 and a CSI IM resource m2 438. Similarly, the NZP IMR resource set 444 may include the NZP IMR resource s1 446 and the NZP IMR resource s2 448. There may be a resource-wise association between CMR and CSI-IM. That is, NZP CMR resource n1 426 may be associated with CSI-IM resource m1 436, and NZP CMR resource n2 428 may be associated with CSI-IM resource m2 438. For NZP-CSI-RS IMR, any single port in the activated resources is assumed as an interference layer. The UE may aggregate all the interference layers in CSI calculation. In other words, each CMR resource may be associated with all NZP IMR resources collectively.

Figures 5, 6:
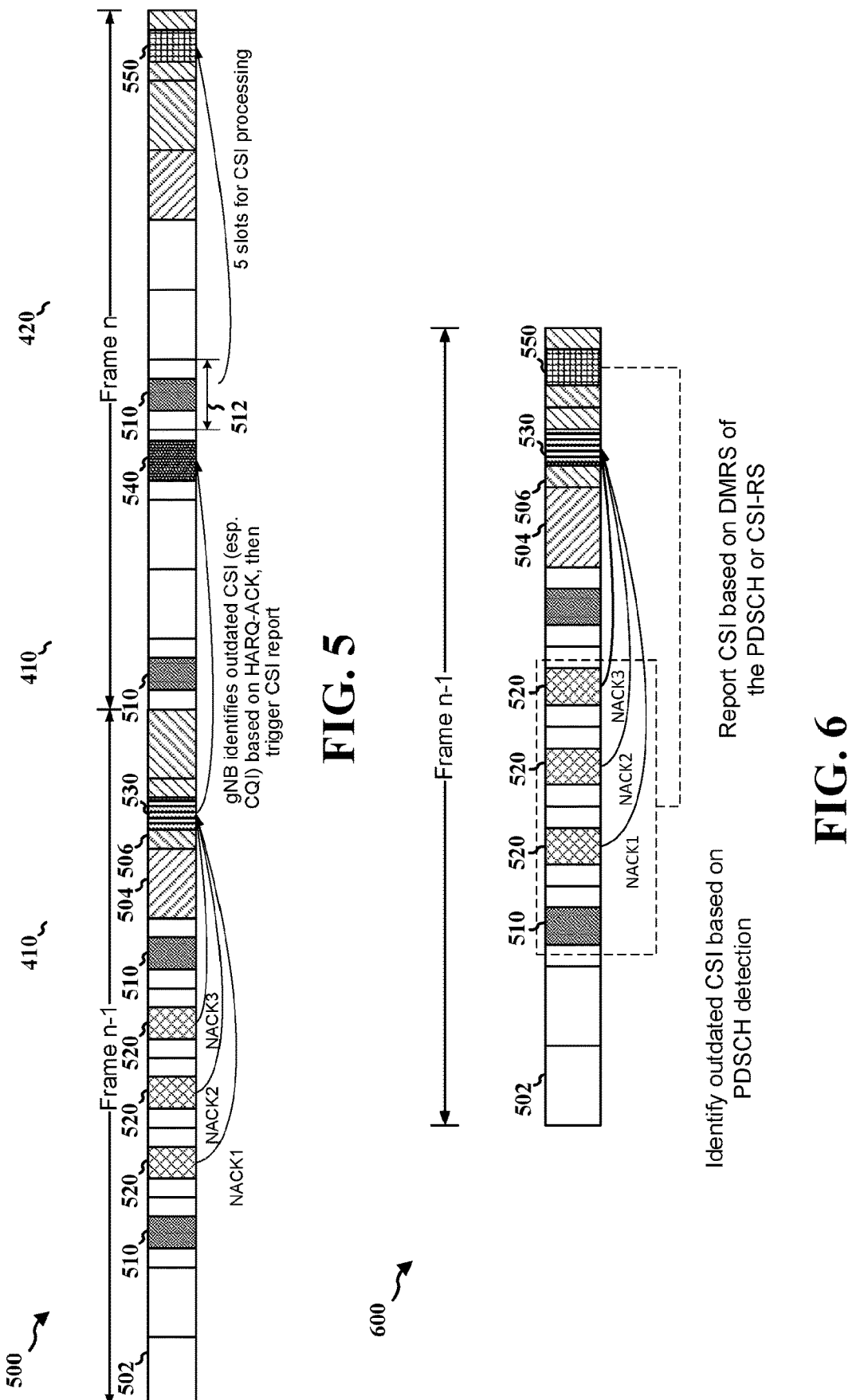
FIG. 5 is a diagram illustrating an example CSI reporting timeline for aperiodic CSI.
FIG. 6 is a diagram illustrating an example CSI reporting timeline for UE initiated CSI reporting.

FIG. 5 is a diagram illustrating an example CSI reporting scheduling 500 for aperiodic CSI. A UE 104 may communicate with a base station 102 over a series of frames. In an implementation, each frame may include downlink slots 502, a special slot 504, and one or more uplink slots 506. Some of the downlink slots 502 may include CSI-RS 510. The base station 102 may transmit a PDSCH 520 on one or more of the downlink slots 502. A modulation and coding scheme (MCS) of the PDSCH 520 may be based on previously reported CSI from the UE 104. If the UE 104 is unable to decode the PDSCH 520, the UE 104 may generate a negative acknowledgment (NACK). In some instances, the base station 102 may also adjust MCS based on ACK/NACK in addition to CSI feedback because CSI feedback may not be frequent. In particular, if the UE 104 sends an ACK, the base station 102 may increase the MCS by a certain level for a next transmission; if the UE 104 sends a NACK, the base station 102 may decrease the MCS by another certain level for a next transmission. In an aspect, if the CSI becomes inaccurate, and if there are multiple consecutive PDSCH to be delivered to the UE, it is likely the UE will fail to decode all of these multiple consecutive PDSCH as there is no possible HARQ-ACK transmission after the failure of the first PDSCH and it is impossible for the base station to update the MCS for the subsequent PDSCH transmissions. The UE may aggregate NACKs in a PUCCH 530 on one of the uplink slots 506. If the base station 102 (e.g., a gNB) receives one or more NACKs, the base station 102 may determine that the CSI is outdated. For example, a channel quality indicator (CQI) may no longer be accurate. The base station 102 may trigger an aperiodic CSI report in response to the one or more NACKs. The base station may transmit an uplink related DCI 540 on one of the downlink slots 502 in the next frame for requesting an aperiodic CSI feedback. The UE may measure one or more CSI-RS transmissions (e.g., periodic CSI-RS 510) no later than the CSI reference resource 512 and generate a CSI report 550 for transmission on PUSCH in an uplink slot 506. Accordingly, aperiodic CSI may take at least a full frame from the first NACK to transmission of the CSI report.

An aperiodic CSI may not be flexible because the aperiodic CSI is triggered via an UL related DCI. In an aspect, the present disclosure provides more flexibility by providing CSI feedback related to a downlink DCI. The DCI may schedule a downlink PDSCH with DMRS. The DCI may or may not indicate CSI reporting. More DCI formats may be used such as UL DCI 0_1 and DL DCI 1_1. The CSI may be transmitted on a reserved uplink resource and not necessarily on dynamically scheduled PUSCH. In some implementations, CSI may be measured or calculated based on DMRS, which may reduce overhead of CSI resources. Use of DMRS may also enable a fast timeline. Additionally, UE initiated CSI feedback may enhance rate-control for high-Doppler scenarios. For example, in FIG. 5, the base station may control whether the UE reports CSI by sending the CSI request or not. The base station may trigger a new CSI report upon identifying the outdated CSI based on the HARQ NACKs. This procedure involves latency between the failed PDSCH and the updated CSI.

FIG. 6 is a diagram illustrating an example CSI reporting scheduling 600 for UE initiated CSI reporting. In an aspect, the present disclosure provides for a shortened CSI reporting timeline in comparison to aperiodic CSI. According to UE initiated CSI reporting, the UE 104 may transmit a CSI report in response to a spectral efficiency of a downlink transmission satisfying a threshold. The UE 104 may measure the spectral efficiency based on a measurement resource such as the CSI-RS 510 or any PDSCH 520, which may include DMRS. The DMRS may be interleaved with the PDSCH, for example, on different symbols in the time domain. The PDSCH 520 including the DMRS may be referred to as a PDSCH/DMRS 520. The time and frequency domain resources for the PDSCH/DMRS may be referred to as PDSCH/DMRS resources. The UE 104 may transmit the CSI report in an uplink slot 506 of the same frame as the HARQ-ACK. For example, the CSI report 550 may be transmitted in the same slot as the PUCCH 530, or in a subsequent slot. Accordingly, UE initiated CSI reporting may reduce the duration of the CSI reporting timeline, thereby allowing faster feedback and faster adaptation to channel conditions.

FIG. 7 is a diagram illustrating an example CSI reporting scheduling 700 for UE initiated CSI reporting based on a CSI-RS. A frame may include downlink slots 502, special slot 504, and uplink slots 506. The UE 104 may measure a CSI-RS 510 to determine a CQI or corresponding feasible MCS. The base station may transmit a DCI 710 on PUCCH in a downlink slot 502. The DCI 710 may be a downlink grant. In this example, the DCI 710 does not request a CSI report. The DCI 710 may schedule a PDSCH 520 having a MCS. In an aspect, the UE 104 may fail to decode the PDSCH 520. The UE 104 may measure a CSI including a CQI based on the CSI-RS 510. The UE 104 may determine to transmit a CSI report based on the measured CQI or feasible MCS. In some implementations, the CQI or feasible MCS may indicate a measured spectral efficiency and the UE 104 may compare the measured spectral efficiency to a threshold. The threshold may be based on a spectral efficiency associated with the indicated MCS and rank of the scheduled PDSCH. For example, the threshold may be a threshold difference between the measured spectral efficiency and the spectral efficiency associated with the indicated MCS and rank of the scheduled PDSCH. The UE 104 may transmit the NACK on the PUCCH 530 and may transmit the CSI report 550 in uplink slots 506.

FIG. 8 is a diagram illustrating an example CSI reporting scheduling 800 for UE initiated CSI reporting based on a PDSCH/DMRS. Similar to the above example, the frame may include downlink slots 502, special slot 504, and uplink slots 506. The UE 104 may receive a DCI 710. The DCI 710 may be a downlink grant that schedules a PDSCH 520 including a DMRS. In this example, the DCI 710 does not request a CSI report. The UE 104 may measure the PDSCH 520 and DMRS to determine the CSI including the CQI or a corresponding MCS. In an aspect, the UE 104 may fail to decode the PDSCH 520. The UE 104 may determine to transmit a CSI report based on the measurement. In some implementations, the measurement may be a measured spectral efficiency such as a CQI or a feasible MCS. The UE 104 may compare the measured spectral efficiency to a threshold. The threshold may be based on a spectral efficiency associated with the indicated MCS and rank of the scheduled PDSCH. For example, the threshold may be a threshold difference between the measured spectral efficiency and the spectral efficiency associated with the indicated MCS and rank of the scheduled PDSCH. The UE 104 may transmit the NACK on the PUCCH 530 and may transmit the CSI report 550 in uplink slots 506.

In an aspect, the UE 104 may selectively report the CSI if the actual spectral efficiency (SE) measured from the CMR and/or IMR is higher or lower than the SE of the scheduled PDSCH 520 by a threshold. The SE of the scheduled PDSCH may be based on the MCS indicated by the DCI 710. The actual SE may refer to a feasible MCS. The CQI may map the feasible MCS to an index. A MCS corresponding to a CQI index may be considered feasible if a single PDSCH transport block with a combination of modulation scheme, target code rate and transport block size corresponding to the CQI index, and occupying a group of downlink physical resource blocks termed the CSI reference resource, could be received with a transport block error probability not exceeding a defined rate such as 0.1 or 0.00001. In some implementations, the decision whether to transmit a CSI report may be based on a spectral efficiency of a measured MCS (MCS_meas) or a measured CQI (CQI_meas) in comparison to a spectral efficiency of an indicated MCS (MCS_indi). For example, the UE 104 may determine to transmit a CSI report if the SE[MCS_meas or CQI_meas)]−SE[MCS_indi]>threshold or SE[MCS_meas or CQI_meas]−SE[MCS_indi]<threshold. In some implementations, the decision whether to transmit the CSI report may also be based on a measured rank (Rank_meas). For example, the UE 104 may determine to transmit a CSI report if SE[MCS_meas or CQI_meas] *Rank_meas−SE[MCS_indi] *Rank_indi>threshold or SE[MCS_meas or CQI] *Rank_meas−SE[MCS_indi]  *Rank_indi<threshold.  In some implementations, the decision whether to transmit a CSI report may also be based on a measured precoding matrix indicator (PMI_meas). For example, the UE 104 may determine to transmit a CSI report if SE[MCS_meas or CQI_meas] *Rank_meas using the PMI_meas−SE[MCS_indi]  *Rank_indi>threshold  or  SE[MCS_meas  or CQI_meas] *Rank_meas using the PMI_meas−SE[MCS_indi] *Rank_indi<threshold. In some aspects, a SE function may be determined based on a table mapping MCS or CQI to a spectral efficiency. For example, 3GPP Technical Specification (TS) 38.214 defines MCS tables 5.1.3.1-1, 5.1.3.1-2, and 5.1.3.1-3 and CQI tables 5.2.2.1-2, 5.2.2.1-3, and 5.2.2.1-4. In an aspect, in the above expressions, the term SE[MCS_meas or CQI_meas] may refer to a spectral efficiency determined based on a table. The UE 104 may determine to transmit a CSI report if a difference between the measured spectral efficiency and the spectral efficiency indicated for the PDSCH is greater than the threshold.

In an aspect, UE initiated CSI reporting may be dynamically activated or deactivated. For example, the base station 102 may transmit an activation/deactivation command, and the UE 104 may receive the activation/deactivation command. The activation/deactivation command may be a MAC-CE or a DCI. In some implementations, the activation command activates UE initiated CSI feedback until the UE receives a deactivation command. In some implementations, the activation command activates UE initiated CSI feedback for a number of CSI report opportunities. For example, the activation command may indicate a number of uplink resources on which the UE may transmit a UE initiated CSI report. The UE initiated CSI feedback may end after the last possible CSI report without the UE receiving a deactivation command. Use of an activation/deactivation command may allow dedicated UL resources to be used for other purposes when UE initiated CSI feedback is deactivated.

Figures 9, 10:
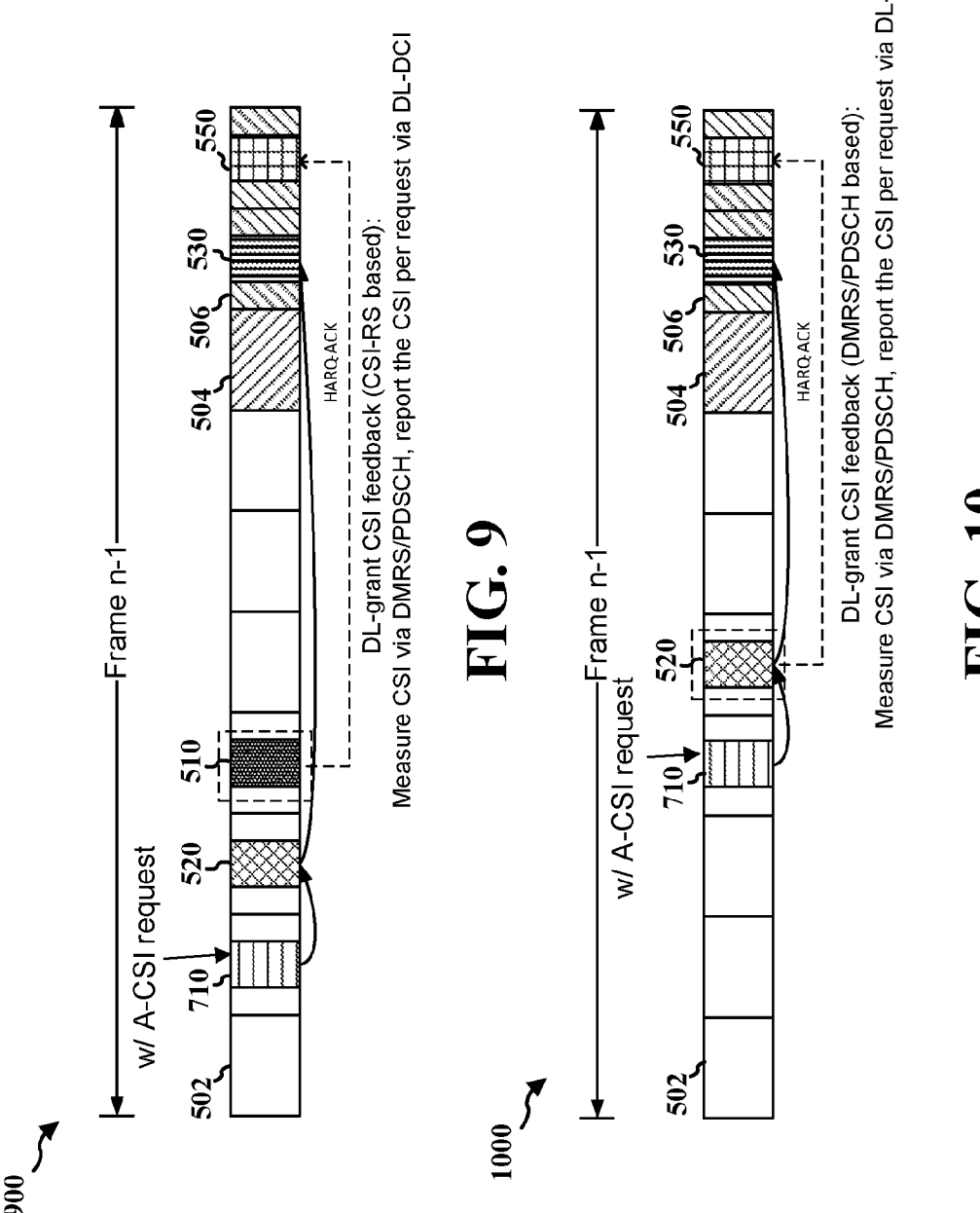
FIG. 9 is a diagram illustrating an example CSI reporting timeline for downlink grant triggered CSI reporting based on a CSI-RS.
FIG. 10 is a diagram illustrating an example CSI reporting timeline for downlink grant triggered CSI reporting based on PDSCH/DMRS.

FIG. 9 is a diagram illustrating an example CSI reporting scheduling 900 for downlink grant triggered CSI reporting based on a CSI-RS. A frame may include downlink slots 502, special slot 504, and uplink slots 506. The base station may transmit a DCI 710 on PUCCH in a downlink slot 502. The DCI 710 may be a downlink grant that schedules PDSCH 520. In this example, the DCI 710 may request a CSI report. The UE 104 may measure the CSI-RS 510 to determine the CSI including any combination of CRI, RI, PMI or CQI. In an aspect, the UE 104 may fail to decode the PDSCH 520. The UE 104 may transmit the NACK on the PUCCH 530 and may transmit the CSI report 550 in uplink slots 506 in response to the request in the DCI 710.

FIG. 10 is a diagram illustrating an example CSI reporting scheduling 1000 for downlink grant triggered CSI reporting based on PDSCH/DMRS. A frame may include downlink slots 502, special slot 504, and uplink slots 506. The base station may transmit a DCI 710 on PUCCH in a downlink slot 502. The DCI 710 may be a downlink grant that schedules PDSCH 520. In this example, the DCI 710 may request a CSI report. The UE 104 may measure a PDSCH 520 and included DMRS to determine the CSI including any combination of CRI, RI, PMI or CQI. In an aspect, the UE 104 may fail to decode the PDSCH 520. The UE 104 may transmit the NACK on the PUCCH 530 and may transmit the CSI report 550 in uplink slots 506.

Figures 11, 12, 13:
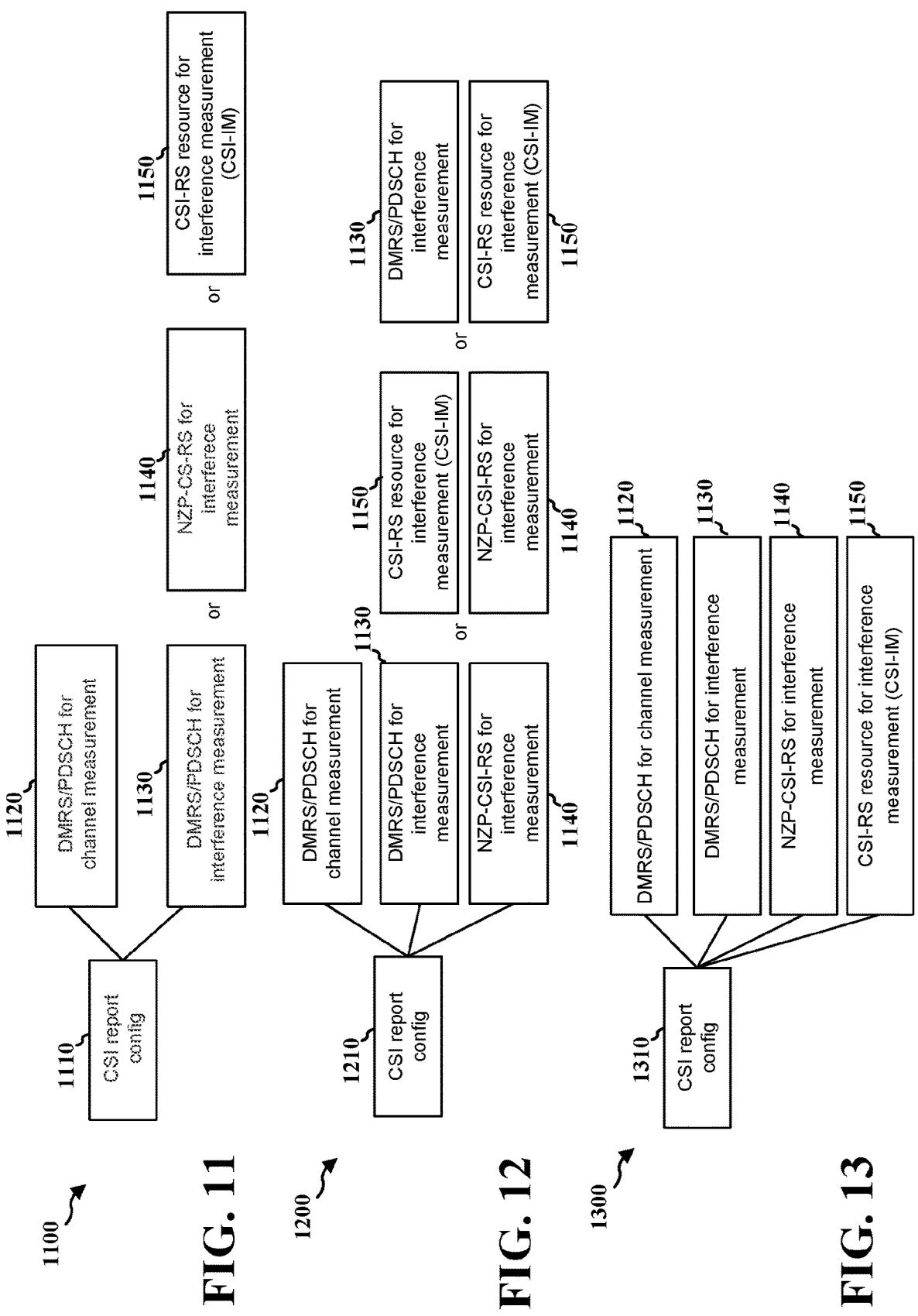
FIG. 11 is a diagram illustrating an example configuration of CSI resources based on DMRS/PDSCH for channel measurement and one interference measurement resource.
FIG. 12 is a diagram illustrating an example configuration of CSI resources based on DMRS/PDSCH for channel measurement and two interference measurement resources.
FIG. 13 is a diagram illustrating an example configuration of CSI resources based on DMRS/PDSCH for channel measurement and three interference measurement resources.

FIG. 11 is a diagram 1100 illustrating an example configuration 1110 of CSI resources based on DMRS/PDSCH for channel measurement and one interference measurement resource. The CSI report configuration 1110 may include the DMRS/PDSCH resource setting 1120 for channel measurement as the CMR. The CSI report configuration 1110 may include 1 IMR such as DMRS/PDSCH resource setting 1130 for interference measurement, NZP-CS-RS resource setting 1140 for interference measurement, or CSI-IM resource setting 1150. If the IMR is the DMRS/PDSCH resource setting 1130 for interference measurement, the interference is the measurement from the DMRS resource elements (REs) or PDSCH REs other than the channel on which a set of DMRS ports for the PDSCH is conveyed or a channel on which the PDSCH is conveyed. For instance, denoting the received signal on a DMRS/PDSCH RE as y=H*x+n, where H is the channel, x is pilot if DMRS or data if PDSCH, n is the interference plus noise. The measurement of the IMR for the DMRS/PDSCH may be the value of n. If the IMR is CSI-IM 1150, there may be a 1-to-1 mapping between the CSI-IM resource and the DMRS/PDSCH resource setting 1120 used for channel measurement.

FIG. 12 is a diagram 1200 illustrating an example configuration 1210 of CSI resources based on DMRS/PDSCH for channel measurement and two interference measurement resources. The CSI report configuration 1210 may include the DMRS/PDSCH resource setting 1120 for channel measurement as the CMR. The CSI report configuration 1110 may include 2 IMR selected from the DMRS/PDSCH resource setting 1130 for interference measurement, the NZP-CS-RS resource setting 1140 for interference measurement, or the CSI-IM 1150.

FIG. 13 is a diagram 1300 illustrating an example configuration 1310 of CSI resources based on DMRS/PDSCH for channel measurement and three interference measurement resources. The CSI report configuration 1310 may include the DMRS/PDSCH resource setting 1120 for channel measurement as the CMR. The CSI report configuration 1110 may include 3 IMR: the DMRS/PDSCH resource setting 1130 for interference measurement, the NZP-CS-RS resource setting 1140 for interference measurement, and the CSI-IM resource setting 1150.

Figures 14, 15, 16:
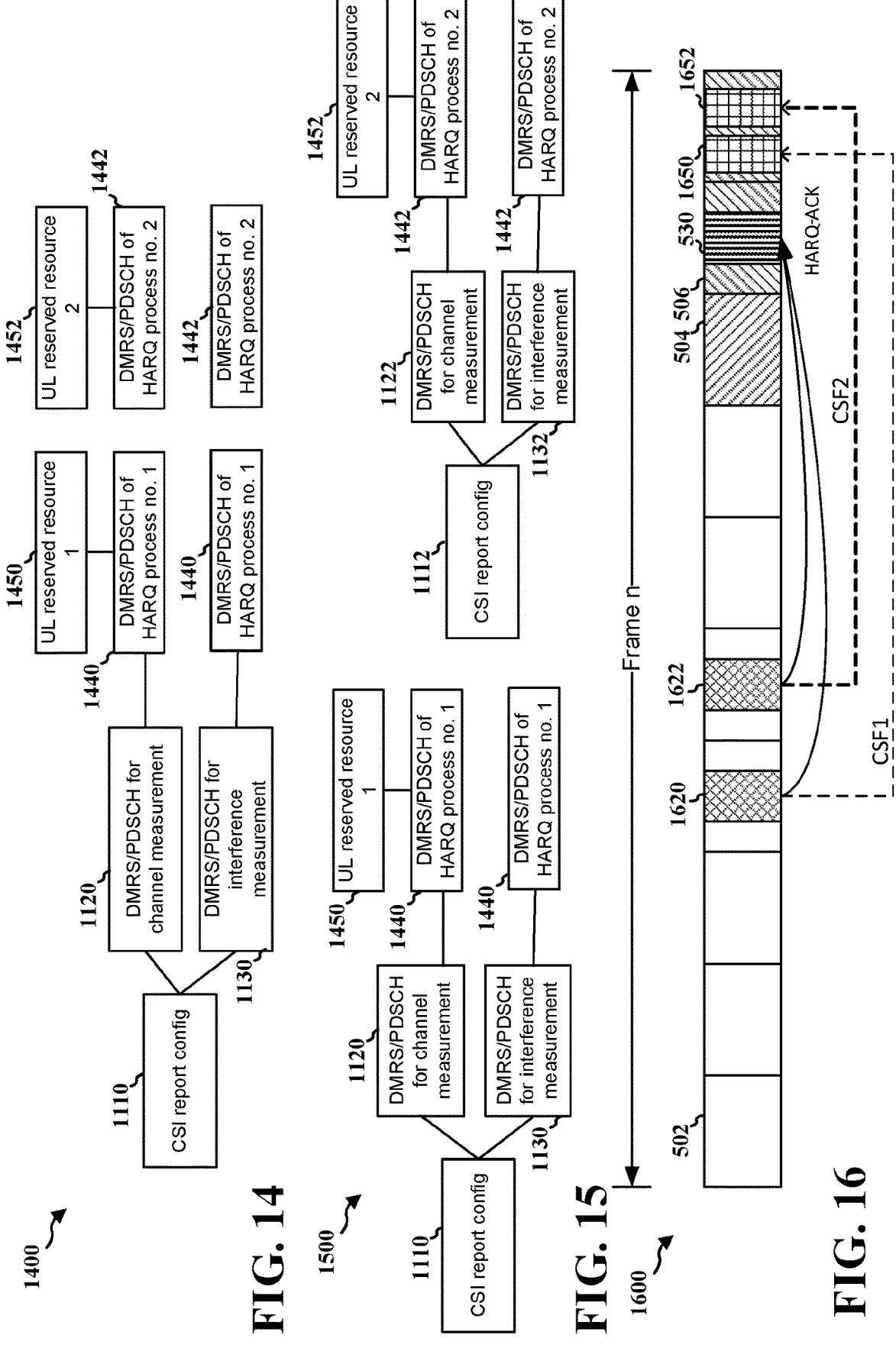
FIG. 14 is a diagram illustrating an example mapping of CSI report configuration to uplink resources based on hybrid automatic repeat request (HARQ) process number.
FIG. 15 is a diagram illustrating an example mapping of CSI report setting to uplink resources.
FIG. 16 is a diagram illustrating an example of CSI reporting indicating an associated HARQ process number.

FIG. 14 is a diagram illustrating an example mapping 1400 of a CSI report configuration 1110 to uplink resources based on HARQ process number. Although the CSI report configuration 1110 including the DMRS/PDSCH resource setting 1120 for channel measurement and the DMRS/PDSCH resource setting 1130 for interference measurement is illustrated, similar mapping may be used for CSI report configurations 1210 and 1310. The DMRS/PDSCH resource setting 1120 for channel measurement may include a DMRS/PDSCH for two or more HARQ process numbers 1440, 1442. Each HARQ process number 1440, 1442 may be associated with a respective uplink reserved resource 1450, 1452. Accordingly, when the UE transmits a CSI report on the uplink reserved resource 1450, 1452, the base station 102 may determine the corresponding HARQ process number and DMRS/PDSCH based on the uplink reserved resource 1450, 1452. The DMRS/PDSCH resource setting 1130 for interference measurement may also be associated with each of the two or more HARQ processes 1440, 1442.

FIG. 15 is a diagram illustrating an example mapping 1500 of CSI report configurations to uplink resources. The UE 104 may be configured with a CSI report configuration 1110, 1112 for each HARQ process number. Once again, although the CSI report configuration 1110 including the DMRS/PDSCH resource setting 1120 for channel measurement and the DMRS/PDSCH resource setting 1130 for interference measurement is illustrated, similar mapping may be used for CSI report configurations 1210 and 1310. The first CSI report configuration 1110 may include the DMRS/PDSCH resource setting 1120 for channel measurement and the DMRS/PDSCH resource setting 1130 for interference measurement, each of which may be associated with a first HARQ process number 1440. The first HARQ process number 1440 may be associated with a first uplink reserved resource 1450. Similarly, a second CSI report configuration 1112 may include the DMRS/PDSCH for channel measurement 1122 and the DMRS/PDSCH for interference measurement 1132, each of which may be associated with a second HARQ process number 1442. The second HARQ process number 1442 may be associated with a first uplink reserved resource 1452. Accordingly, due to the mapping 1500, when the UE transmits a CSI report on the uplink reserved resource 1450, 1452, the base station 102 may determine the corresponding HARQ process number and DMRS/PDSCH based on the uplink reserved resource 1450, 1452.

FIG. 16 is a diagram 1600 illustrating an example of CSI reporting indicating an associated HARQ process number. For example, a frame may include downlink slots 502, special slot 504, and uplink slots 506. The UE 104 may receive a DMRS/PDSCH 1620, 1622 in two of the downlink slots 502, each DMRS/PDSCH associated with a different HARQ process. The UE 104 may transmit the HARQ-ACK for each of the DMRS/PDSCH 1620, 1622 in the PUCCH 530. The UE may transmit two CSI reports 1650, 1652 in the corresponding UL resource. In an aspect, there may be no specific mapping between HARQ process number and uplink resource. The UE 104 may provide the HARQ process number together with the CSI report. If there is no mapping between HARQ process number and uplink resource, each of the CSI reports 1650, 1652 may include an indication of the corresponding HARQ process number. Accordingly, the base station 102 receiving the CSI reports 1650, 1652 may determine the corresponding DMRS/PDSCH 1620, 1622. If the uplink resource used to carry the CQI is specific to each HARQ process number, the CSI report may not include an indication of the corresponding HARQ process number.

As discussed above, for example, with respect to FIGS. 7 and 9, a CSI-RS may also be used as the CMR. In such cases, a CSI report configuration 410 as described with respect to FIG. 4 may be used for either UE initiated CSI feedback or downlink grant based CSI feedback. A CSI for CSI-RS based reporting may include a CRI, PMI, RI, CQI, or any combination thereof as configured in the CSI report configuration 410.

In some implementations, the CSI report 550 based on either UE initiated CSI feedback or downlink grant based CSI feedback may utilize uplink resources with limited capacity. The number of bits transmitted in the CSI report 550 may be reduced compared to conventional CSI reports based on an uplink grant. For example, in some implementations, the CSI report 550 may be a single bit. In an aspect, the single bit, when transmitted, may indicate that the feasible MCS based on the measurements is much less than the configured MCS of the associated PDSCH. That is, the MCS_meas−MCS_indi<threshold, where the threshold has a negative value. In another implementation, the single bit, when transmitted, may indicate that the measured MCS is much higher than indicated MCS. In yet another implementation, the single bit, when transmitted, may indicate that the measured MCS is much different than the indicated MCS i.e., |MCS_meas-MCS_indi|>threshold. In an aspect, the comparison of the MCS and/or CQI may be based on a spectral efficiency. For example, the MCS and/or CQI may be converted to a spectral efficiency using the tables discussed above. In another aspect, the single bit may be one of two states (e.g., 0 or 1). The first state may indicate that the feasible MCS is much less than the configured MCS of the associated PDSCH. That is, the MCS_meas−MCS_indi<threshold, where the threshold has a negative value. The second state may indicate that the feasible MCS is much higher than the configured MCS of the associated PDSCH, i.e., MCS_meas−MCS_indi>threshold, where the threshold has a positive value. The single bit CSI report may provide only CQI. In some implementations, the single bit CSI may account for rank indicator (RI) as discussed above regarding the reporting thresholds. The single bit CSI report may not be able to account for a PMI.

In some implementations, the CSI report 550 may include an explicit CQI report. For example, the CSI report 550 may represent the CQI as a 4-bit index to a CQI table or a 2-bit differential from a previously reported CQI value. The CSI report 550 may also include a RI indicating the rank used to determine the reported CQI.

For both UE initiated CSI reporting and DL grant based CSI report, the base station 102 may configure a dedicated uplink resource. In some implementations, the dedicated uplink resource may be PUCCH and/or PUSCH resource.

For example, the base station 102 may transmit an RRC configuration message to configure a list of PUCCH or PUSCH resource configurations. Each resource configuration may include at least a frequency domain resource allocation (FDRA), a PUCCH format, and a time domain resource allocation (TDRA). The FDRA may indicate one or more resource elements (REs). The TDRA may indicate a starting symbol and length in a slot.

The UE 104 may select resources from the list of PUCCH or PUSCH resource configurations for the CSI report. In some implementations, for example, the UE 104 may determine the PUCCH/PUSCH resource per report/resource configuration or trigger state configuration. There may be a 1-to-1 mapping between PUCCH/PUSCH for CSI and the report/resource/trigger state configuration. For instance, as illustrated in FIG. 15, the UL reserved resource 1450 may be mapped to the CSI report configuration 1110 or the DMRS/PDSCH resource setting 1120. In some implementations, the PUCCH/PUSCH resource may be determined per HARQ-ACK process number. For example, as illustrated in FIG. 14, there may be a 1-to-1 mapping between PUCCH/PUSCH for CSI (e.g., UL reserved resource 1450) and the HARQ process number 1440. In some implementations, the PUCCH/PUSCH resource is determined via a dedicated field in the DL grant. In some implementations, the PUCCH/PUSCH resource for CSI feedback is based on a resource wise (1-to-1) mapping to the PUCCH resource used for HARQ-ACK, and the actually used the PUCCH/PUSCH for CSI feedback is determined based on a legacy PUCCH-resource-indicator field provided in the DL DCI. For example, a codepoint in the DL DCI indicates a pair of PUCCH resources for HARQ-ACK and PUCCH/PUSCH resource for CSI.

Figures 17, 18:
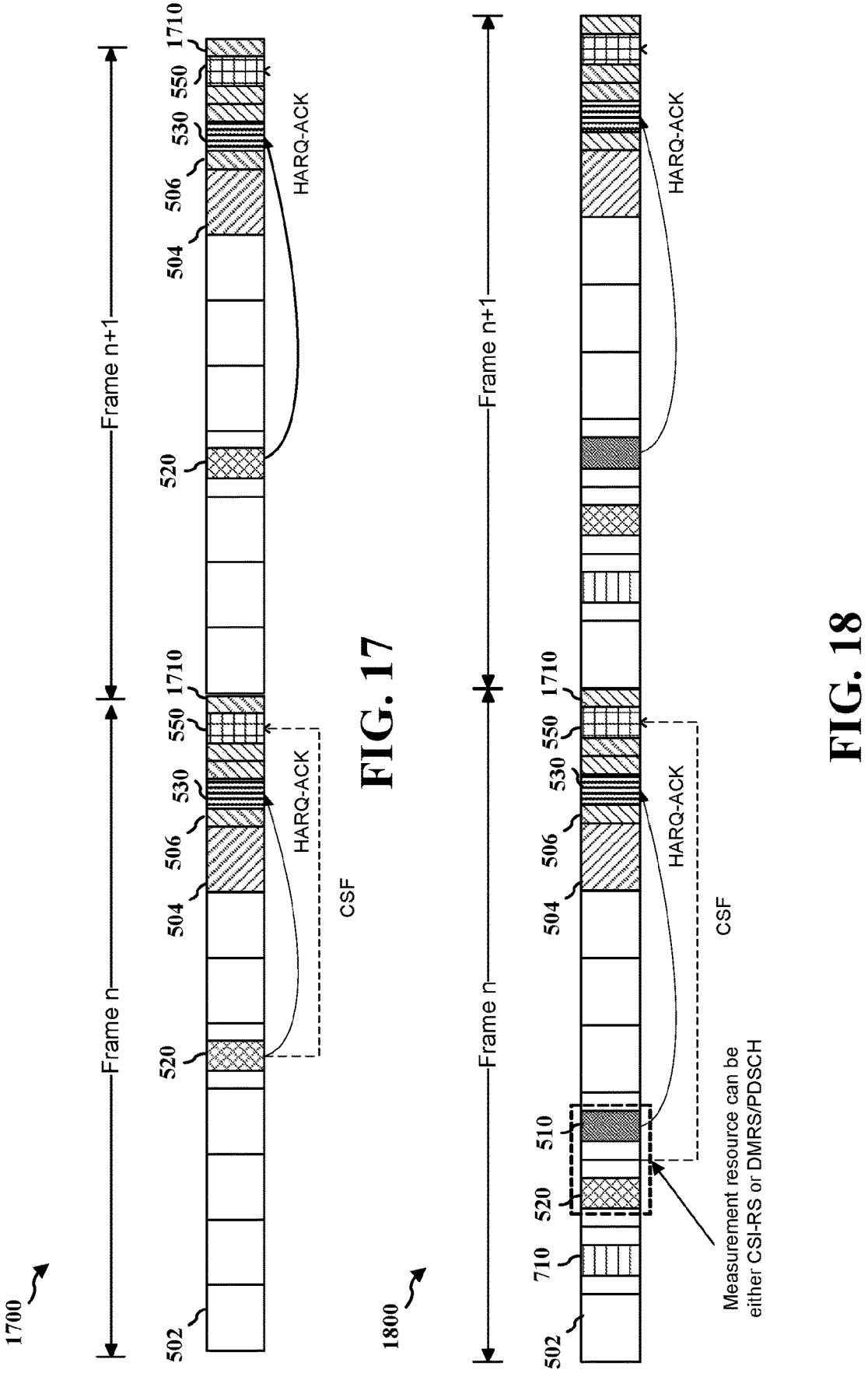
FIG. 17 is a diagram illustrating an example CSI reporting timeline for a physical uplink control channel (PUCCH)/physical uplink shared channel (PUSCH) resource for UE initiated CSI.
FIG. 18 is a diagram illustrating an example CSI reporting timeline for a PUCCH/PUSCH resource for downlink grant CSI.

FIG. 17 is a diagram illustrating an example CSI reporting scheduling 1700 for a PUCCH or PUSCH resource for UE initiated CSI. The UE 104 may determine the slot of the PUCCH/PUSCH carrying the CSI report 550 based on the measurement resource. For UE initiated CSI reporting, the measurement resource may be the PDSCH/DMRS 520. In some implementations, the periodicity and slot offset (relative to slot 0) may configured via RRC together with the resource configuration. For example, the reserved uplink resources may be configured as a configured grant PUSCH or a PUCCH resource similar to the PUCCH-CSI-resource used for periodic CSI reporting. As illustrated, for example, the tenth slot 1710 (slot offset (s)=9; periodicity (T)=1 frame) may be configured as the reserved uplink resource. The CSI report 550 may be transmitted on PUCCH/PUSCH resources on slot s, s+T, s+2T, and so forth. The UE may transmit the CSI report via the most recent PUCCH that satisfies the CSI timeline. The CSI timeline specifies a minimum gap (Z') between the UL resource carrying the CSI and the measurement resource, and may also specify a minimum gap (Z) between the UL resource carrying the CSI and the CSI request.

FIG. 18 is a diagram illustrating an example CSI reporting scheduling 1800 for a PUCCH/PUSCH resource for downlink grant CSI. Similar to the CSI reporting scheduling 1700, the tenth slot 1710 (s=9, T=1 frame) may be configured as the reserved uplink resource. For downlink grant based CSI, the measurement resource may be either a PDSCH/DMRS 520 or a CSI-RS 510 following the downlink grant 710. Accordingly, the CSI report 550 based on either the PDSCH/DMRS 520 or the CSI-RS 510 may be transmitted in the tenth slot 1710.

In some implementations, the slot where the PUCCH carrying the CSI is transmitted is determined by a slot offset to a reference slot. The reference slot can be the slot of the DL-DCI 510, DMRS/PDSCH 520, or HARQ-ACK 530. The slot offset may be indicated via a dedicated field in the DL-DCI, or via the PDSCH-to-HARQ_feedback timing indicator field in the DL-DCI. For example, a codepoint in the PDSCH-to-HARQ_feedback timing indicator field may indicate a pair of {k0, k0'}, and the candidate list of pairs may be provided by RRC. k0 may be a scheduling offset between the HARQ-ACK relative to the PDSCH/DMRS. k0' may be an offset of the CSI feedback relative to a reference slot as discussed herein.

Figures 19, 20, 21:
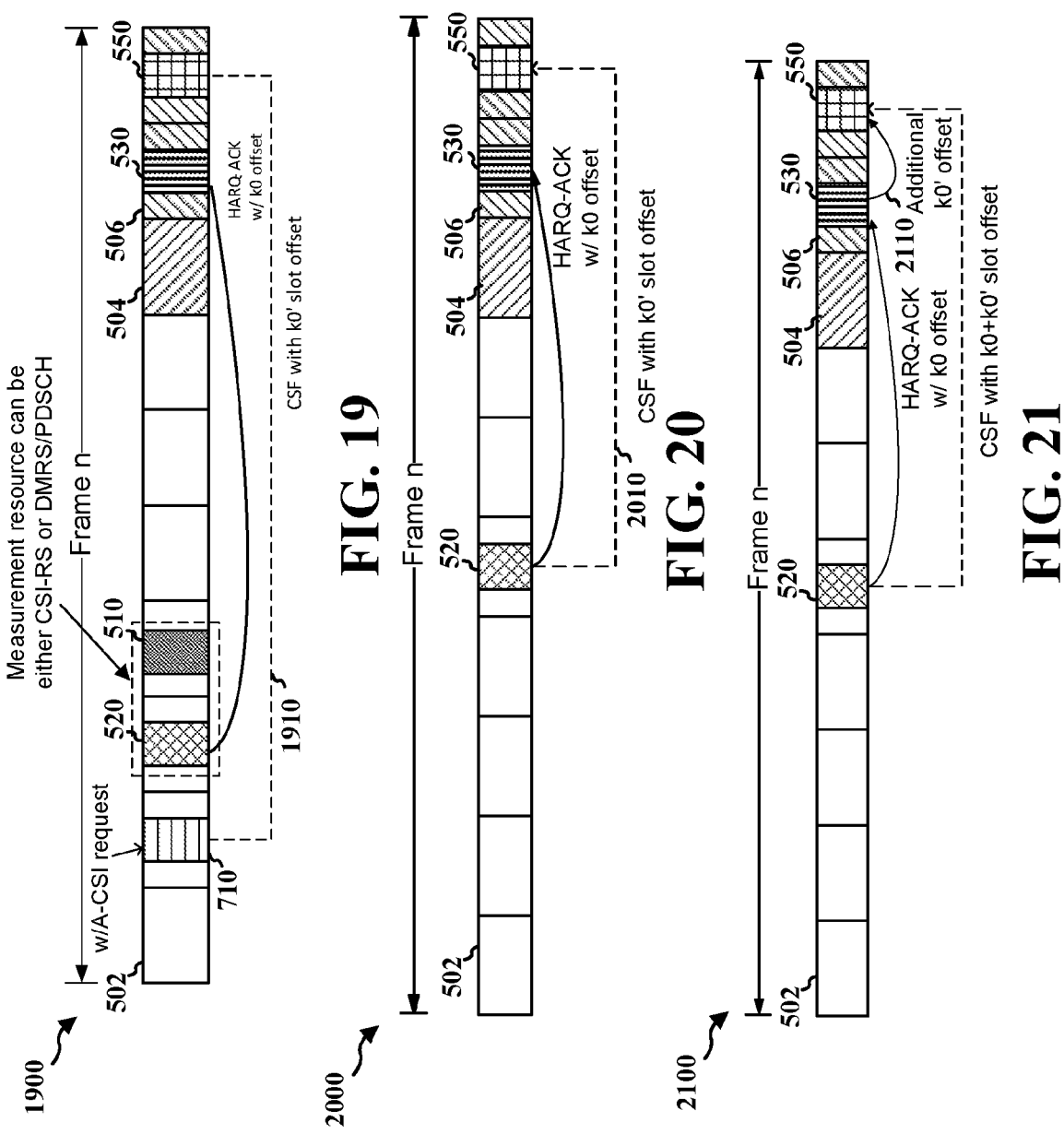
FIG. 19 is a diagram illustrating an example CSI reporting timeline based on a slot offset from a downlink grant.
FIG. 20 is a diagram illustrating an example CSI reporting timeline based on a slot offset from a PDSCH/DMRS.
FIG. 21 is a diagram illustrating an example CSI reporting timeline based on a slot offset from a HARQ-acknowledgment (ACK) slot.

FIG. 19 is a diagram illustrating an example CSI reporting scheduling 1900 based on a slot offset (k0') 1910 from a downlink grant as the reference slot. A frame may include downlink slots 502, special slot 504, and uplink slots 506. The measurement resource may be either the CSI-RS 510 or the DMRS/PDSCH 520. The UE 104 may transmit a HARQ-ACK on PUCCH 530 in an uplink slot 506 based on a k0 offset from the DMRS/PDSCH 520. The UE 104 may transmit the CSI report 550 in an uplink slot 506 based on the k0' slot offset from the downlink grant 710.

FIG. 20 is a diagram illustrating an example CSI reporting scheduling 2000 based on a slot offset k0' 2010 from a PDSCH/DMRS 520 as the reference slot. A frame may include downlink slots 502, special slot 504, and uplink slots 506. Both the k0 offset for the HARQ-ACK and the k0' offset for the CSI report may be measured from the PDSCH/DMRS 520.

FIG. 21 is a diagram illustrating an example CSI reporting scheduling 2100 based on a slot offset 2110 from a HARQ-ACK slot as the reference slot. A frame may include downlink slots 502, special slot 504, and uplink slots 506. A HARQ-ACK may be transmitted on PUCCH 530 in an uplink slot 506 based on a k0 offset from a PDSCH/DMRS 520. An additional k0' offset 2110 may be measured from the slot of the PUCCH 530 to determine the slot of the CSI report 550.

In another aspect, the reserved uplink resource may be a scheduling request (SR) resource. The SR resource may be utilized for UE initiated CSI feedback. The base station 102 may configure the UE 104 with the SR resource to be used for requesting an uplink grant. The SR resource may be a PUCCH resource defined by a periodicity and a slot and symbol offset. The UE 104 may determine the SR resource for a CSI report per report or resource configuration, per HARQ process number, or via a dedicated field in the downlink grant. In an implementation, the SR resource for CSI feedback may be resource wise (i.e., 1-to-1) mapped to the PUCCH resource used for HARQ-ACK, and the PUCCH resource for CSI feedback may be determined based on a PUCCH-resource indicator field included in the downlink grant. For example, a codepoint in a downlink grant may indicate a pair of PUCCH resources for the HARQ-ACK and the SR resource for CSI.

Figures 22, 23:
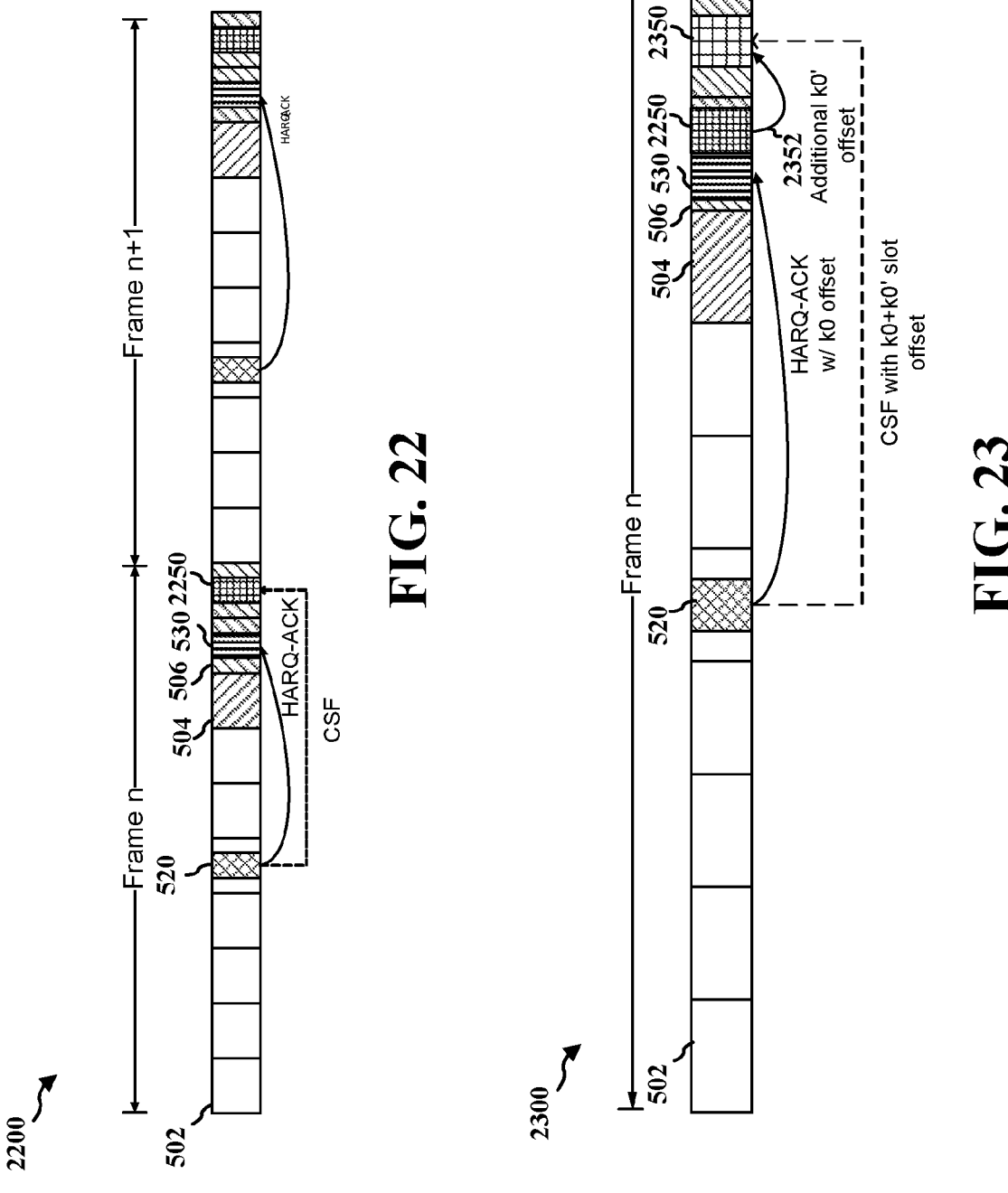
FIG. 22 is a diagram illustrating an example CSI reporting timeline for a scheduling request (SR) resource.
FIG. 23 is a diagram illustrating an example CSI reporting timeline for a SR resource and PUCCH/PUSCH resource.

FIG. 22 is a diagram illustrating an example CSI reporting scheduling 2200 for a SR resource 2250. A frame may include downlink slots 502, special slot 504, and uplink slots 506. The SR resource 2250 for the CSI report may be determined based on the report configuration, the measurement resource configuration, or the HARQ process number of the PDSCH/DMRS 520. In some implementations, a downlink grant may include a codepoint defining the resources of both the PUCCH 530 and the SR resource 2250. In an aspect, the SR resource 2250 may be a single resource element and may be capable of only carrying one or two bits. As discussed above, the UE 104 may transmit a CSI report including a single-bit CQI indication, which may be transmitted on the SR resource 2250.

FIG. 23 is a diagram illustrating an example CSI reporting scheduling 2300 for a SR resource 2250 and a PUCCH/PUSCH resource 2350. The addition of the PUCCH/PUSCH resource 2350 to the SR resource 2250 may allow transmission of a larger CSI report including, for example, a full CQI, a PMI, and a RI. In this example, the SR resource 2250 is used to let indicate to the base station that the UE 104 will transmit a CSI report. The slot of the PUCCH/PUSCH resource 2350 may be configured via a slot-offset 2352 from the SR resource 2250. That is, there may be a 1-to-1 mapping between the SR resource 2250 and the dedicated PUCCH/PUSCH resource 2350. The gap (i.e., slot-offset 2352) between the SR resource 2250 and the dedicated PUCCH/PUSCH resource 2350 may be fixed (e.g., defined by a standards document or regulation) or RRC configured.

Figures 24, 25:
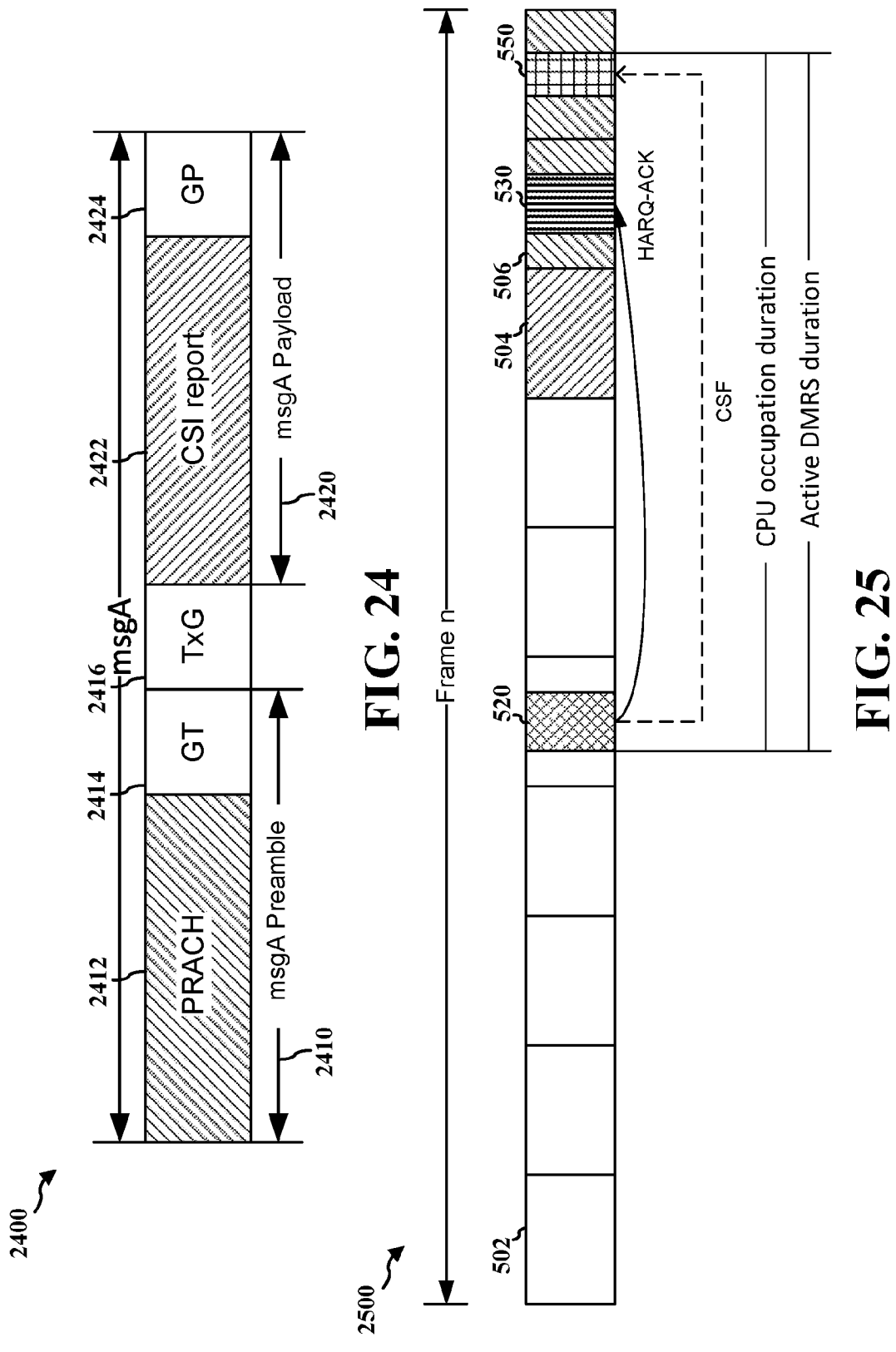
FIG. 24 is a diagram illustrating an example two-step random access message for CSI reporting.
FIG. 25 is a diagram illustrating an example CSI processing unit occupation duration and active DMRS duration CSI processing.

FIG. 24 is a diagram illustrating an example two-step random access message 2400 for CSI reporting. A dedicated two-step random access resource may be configured for UE initiated CSI feedback. The two-step random access message may be a random access msgA and include a msgA preamble 2410 and a msgA payload 2420. The msgA preamble 2410 may include transmission of a preamble on the physical random access channel (PRACH) 2412. The preamble may be used to identify the UE 104. For example, the preamble may be a contention-free random access preamble assigned to the UE 104. The msgA preamble 2410 may also include a guard time (GT) 2414. The msgA preamble 2410 may be separated from the msgA payload by a transmission gap (TxG) 2416. The msgA payload 2420 may be transmitted on a PUSCH resource. The msgA payload 2420 may carry the UE initiated CSI report 2422. The CSI report 2422 may be only a part of or may be all of msgA payload 2420. The msgA payload 2420 may also include a guard period (GP) 2424.

In an aspect, UE initiated CSI feedback and DL grant based CSI feedback using reserved uplink resources may be applicable when the UE fails to decode a downlink PDSCH. That is, the failure to decode may result in a negative acknowledgment (NACK). If the UE 104 successfully decodes the PDSCH and reports an ACK for a HARQ-ACK process, then the UE may not report CSI in the reserved UL resource. The base station 102 may receive the ACK and determine not to decode the reserved uplink resource. If the UE fails to decode the PDSCH and reports a NACK for a HARQ-ACK process, the UE may selectively report a CSI in the reserved UL resource. For example, the UE may report the CSI in the reserved UL resource based on a measurement satisfying a threshold, or based on an indication in the downlink grant as discussed above. In some implementations, the base station 102 may only decode the CSI at the reserved uplink resource after receiving a NACK.

In an aspect, both UE initiated CSI feedback and DL grant based CSI may enable measurement of DMRS/PDSCH for CSI, which may provide greater flexibility in scheduling CSI reports and shorten a feedback timeline. The definition of CSI based on DMRS/PDSCH may be different than CSI based on CSI-RS.

For DMRS based CSI feedback, the reference resource used for CQI reporting is the slot where the DMRS/PDSCH is transmitted. The overhead assumption used for CQI calculation follows the actual transmitted signal in the CSI reference resource (i.e., the slot where the DMRS/PDSCH is transmitted) or based on a default assumption as specified in sec 5.2.2.5 of TS 38.214. The overhead refers to the number of control channels, number of DMRS+PDSCH symbols, bandwidth part subcarrier spacing, bandwidth, CP length, presence of CSI-RS or PBCH or SSB, etc.

The CSI reporting band for DMRS based CSI is equal to the frequency domain allocation of the DMRS/PDSCH for the UE. For DMRS based CSI, only wideband CSI including CQI and RI may be reported, and the wideband is defined w.r.t. the FDRA of the DMRS/PDSCH. If RBG/PRG-level CQI are reported, the PRG/RBG is the same as the DMRS/PDSCH used for CSI measurement, or separately configured in the CSI reporting setting.

FIG. 25 is a diagram 2500 illustrating an example CSI processing unit (CPU) occupation duration and active DMRS duration for CSI processing. The total number of CPUs and active DMRS ports is subject to UE capability. That is, a UE 104 may be able to concurrently determine a limited number of CSIs based on the number of CPUs and may have a limited number of DMRS ports. For DMRS based CSI feedback, the CPU occupation is equal to 1 per DMRS/PDSCH resource. The CPU occupation time starts from the first symbol of the earliest of DMRS/PDSCH 520 used for channel measurement and resources for interference measurement and ends at the last symbol of the UL channel that carries the CSI report 550. For DMRS based CSI feedback, the DMRS ports are referred to as active and is the ports are active from the earliest symbol of the DMRS/PDSCH 520 used for channel measurement or interference measurement to the last symbol of the UL channel that carries the CSI report 550. Accordingly, the UE 104 and/or the base station 102 may determine whether the UE has the resources to calculate a CSI based on the UE capabilities and other scheduled CSI calculations.

Figure 26:
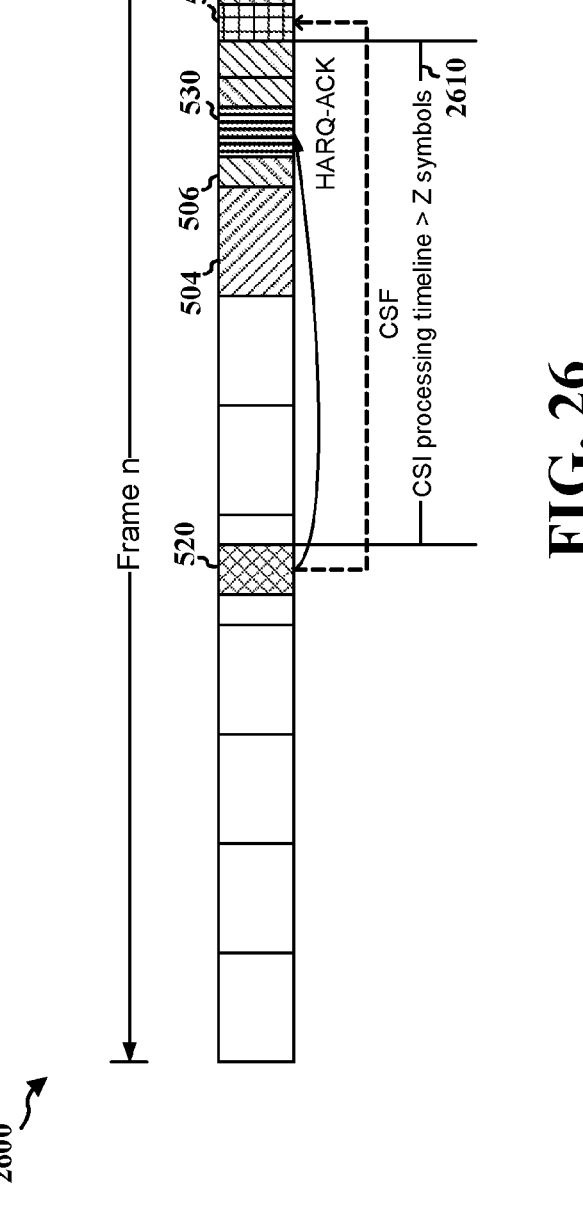
FIG. 26 is a diagram illustrating an example CSI processing timeline.

In an aspect, the UE 104 may use an amount of time to calculate a CSI and generate a CSI report. Although the present disclosure provides for faster CSI reporting timelines, there may be a minimum amount of time between the measurement resources and the CSI report for the UE to generate the CSI report. FIG. 26 is a diagram illustrating an example CSI processing timeline 2600. A frame may include downlink slots 502, special slot 504, and uplink slots 506. The CSI report 550 may be based on the PDSCH/DMRS 520. The minimum amount of time between the PDSCH/DMRS 520 and the CSI report may be defined as a number of symbols (Z') 2610. For downlink grant based feedback, there may also be a minimum amount of time between the downlink grant (e.g., DCI 710) and the CSI report. The minimum amount of time between the DCI 710 and the CSI report may be defined as a number of symbols (Z). The minimum amount of time may depend on whether there are multiple CSI reports using CPU or DMRS resources and a complexity of the CSI calculation. The latest symbol of the DMRS/PDSCH 520 used for channel/interference measurement should be at least a number (Z') symbols earlier than the first symbol of the uplink channel that carries the CSI report 550. Z' may follow a fast timeline of table 1 if there is a single CSI report to be transmitted or if there is a single CSI during the activation time of the DMRS.

TABLE 1

| | $Z_1$ [symbols] | |
| --- | --- | --- |
| $\mu$ | $Z_1$ | $Z'_1$ |
| 0 | 10 | 8 |
| 1 | 13 | 11 |
| 2 | 25 | 21 |
| 3 | 43 | 36 |

If the conditions for the fast timeline are not met, Z' follows a slow timeline according to table 2, where Z' may be either the Z1' or the Z2' value.

TABLE 2

| | $Z_1$ [symbols] | | $Z_2$ [symbols] | | $Z_3$ [symbols] | |
| --- | --- | --- | --- | --- | --- | --- |
| $\mu$ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

$Z'_1$ may be used for wideband CSI with 4 or fewer DMRS ports, a single resource, and a type 1 CSI with no PMI. $Z'_3$ may be used for beam management. $Z'_2$ may be used for all other cases.

If the CSI is transmitted on the same slot as the HARQ-ACK, or transmitted in the same PUCCH with the HARQ-ACK, the CSI timeline should follow the largest of Z' and the timeline of HARQ-ACK, e.g., an N1 value.

Conventional CSI reports may be associated with a priority for determining which reports to transmit when multiple reports are scheduled on the same resources. A priority of a CSI report may be based on a function of a CSI report trigger (y), CSI report content (k), a serving cell index, and a report configuration ID. Two CSI reports are said to collide if the time occupancy of the physical channels scheduled to carry the CSI reports overlap in at least one OFDM symbol and are transmitted on the same carrier. When a UE is configured to transmit two colliding CSI reports, the UE may determine whether to multiplex or drop one or more of the CSI reports based on the priority.

In an aspect of the present disclosure, the priority function may be calculated using the resource type used for channel measurement, or based on whether the CSI is a UE initiated CSI, or based on whether an A-CSI is transmitted on PUCCH. The DMRS/PDSCH based CSI or UE initiated CSI may be set to have the highest priority or the lowest priority. For example, to set the DMRS/PDSCH based CSI or UE initiated CSI as the highest priority, the priority function may be defined as: $Pri(x,y,k,c,s)=4.2N\_cells \cdot M\_s \cdot x + 2N\_cells \cdot M\_s \cdot y + N\_cells \cdot M\_s \cdot k + M\_s \cdot c + s$ where x to 0 if DMRS/PDSCH based CSI or UE initiated CSI) and x is equal to 1 if non-DMRS/PDSCH based CSI (resp. non-UE initiated CSI). Alternatively, the CSI report trigger type (y) may be expanded to include values for DMRS/PDSCH based CSI or UE initiated CSI. For example, to set the DMRS/PDSCH based CSI or UE initiated CSI as the highest priority, the priority function may be defined as: $Pri(y,k,c,s)=2N\_cells \cdot M\_s \cdot y + N\_cells \cdot M\_s \cdot k + M\_s \cdot c + s$, where y equals 0 if the CSI is DMRS/PDSCH based CSI or UE initiated CSI), y equals 1 if A-CSI based on CSI-RS; y equals 2 for CSI-RS based SP-CSI on PUSCH; y equals 3 for CSI-RS based SP CSI on PUCCH; and y equals 4 for CSI-RS based P-CSI.

Conversely, the priority function may be defined to set DMRS/PDSCH based CSI or UE initiated CSI as the lowest priority. For example, to set the DMRS/PDSCH based CSI or UE initiated CSI as the lowest priority, the priority function may be defined as: $Pri(x,y,k,c,s) = 4.2N\_cells \cdot M\_s \cdot x + 2N\_cells \cdot M\_s \cdot y + N\_cells \cdot M\_s \cdot k + M\_s \cdot c + s$, where x equals 0 if the CSI is non-DMRS/PDSCH based CSI or non-UE initiated CSI and x equals 1 if DMRS/PDSCH based CSI or UE initiated CSI). As another example, the CSI report trigger type (y) may be expanded to include values for DMRS/PDSCH based CSI or UE initiated CSI. For example, to set the DMRS/PDSCH based CSI or UE initiated CSI as the lowest priority, the priority function may be defined as: $Pri(y,k,c,s)=2N\_cells \cdot M\_s \cdot y + N\_cells \cdot M\_s \cdot k + M\_s \cdot c + s$, where y is defined as above for values 0, 1, 2, and 3 as before; and y equals 4 for DMRS/PDSCH based CSI or UE initiated CSI. If DMRS/PDSCH based CSI or UE initiated CSI collides with other aperiodic, semi-persistent, or periodic CSIs measured on CSI-RS, either is dropped depending on which has the lower priority. For example, aperiodic CSI on PUCCH may have a lower priority than semi-persistent CSI on PUSCH, but higher priority than semi-persistent CSI on PUCCH. For instance, using the above priority function, y may equal 0 for aperiodic CSI on PUSCH, y may equal 1 for semi-persistent CSI on PUSCH, y may equal 2 for aperiodic CSI on PUCCH, and y may equal 4 for CSI-RS based periodic CSI. If aperiodic CSI on PUCCH collides with aperiodic CSI on PUSCH or semi-persistent CSI on PUSCH, the aperiodic CSI on PUCCH may be dropped. If aperiodic CSI on PUCCH collides with semi-persistent CSI on PUCCH or periodic CSI on PUCCH, the colliding CSIs may be multiplexed, partially-omitted, or dropped based on the priority order from high to low.

Figure 27:
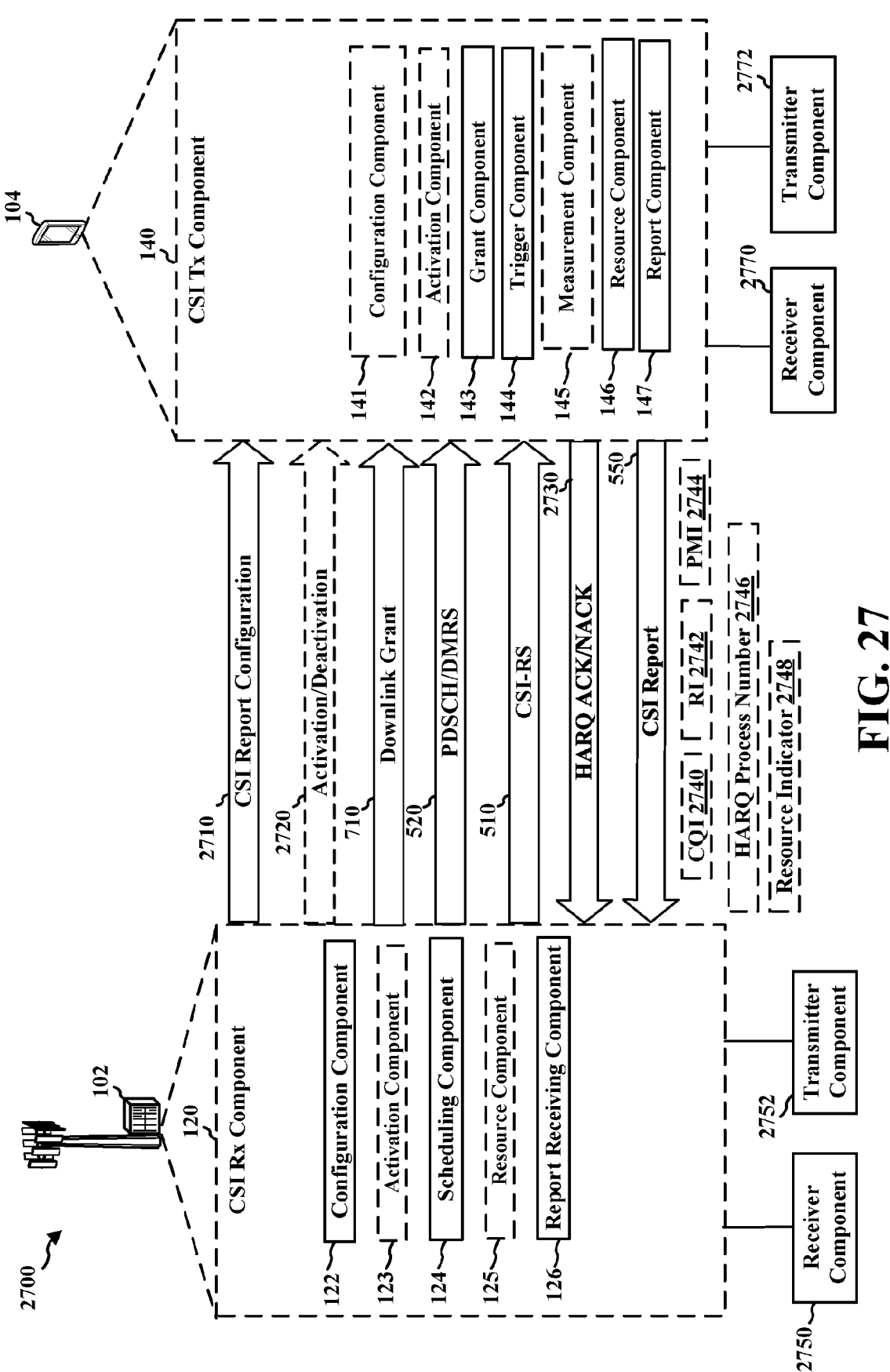
FIG. 27 is a diagram illustrating example communications and components of a base station and a UE.

FIG. 27 is a diagram 2700 illustrating example communications and components of a base station 102 and a UE 104. The UE 104 may include the CSI Tx component 140. The base station 102 may include the CSI Rx component 120. The CSI Rx component 120 may be implemented by the memory 376 and the TX processor 316, the RX processor 370, and/or the controller/processor 375 of FIG. 3. For example, the memory 376 may store executable instructions defining the CSI Rx component 120 and the TX processor 316, the RX processor 370, and/or the controller/processor 375 may execute the instructions. The CSI Tx component 140 may be implemented by the memory 360 and the TX processor 368, the RX processor 356, and/or the controller/processor 359. For example, the memory 360 may store executable instructions defining the CSI Tx component 140 and the TX processor 368, the RX processor 356, and/or the controller/processor 359 may execute the instructions.

As discussed with respect to FIG. 1, the CSI Tx component 140 may include the configuration component 141, the activation component 142, the grant component 143, the trigger component 144, the measurement component 145, the resource component 146, and the report component 147. The CSI Tx component 140 be coupled with a receiver component 2770 and a transmitter component 2772 of the UE 104/350. The receiver component 2770 may include, for example, a radio-frequency (RF) receiver for receiving the signals described herein. The transmitter component 2772 may include for example, an RF transmitter for transmitting the signals described herein. In some implementations, the receiver component 2770 and the transmitter component 2772 may be co-located in a transceiver such as transceiver 354 (FIG. 3).

The CSI Rx component 120 may include the configuration component 122, the scheduling component 124, and the report receiving component 126 as discussed above regarding FIG. 1. The CSI Rx component 120 also may optionally include an activation component 123 and a resource component 125. The CSI Rx component 120 also may be coupled with a receiver component 2750 and a transmitter component 2752 of the base station 102/310. The receiver component 2750 may include, for example, a RF receiver for receiving the signals described herein. The transmitter component 2752 may include for example, an RF transmitter for transmitting the signals described herein. In some implementations, the receiver component 2750 and the transmitter component 2752 may be co-located in a transceiver such as transceiver 318 (FIG. 3).

The configuration component 122 at the base station 102 may configure the UE 104 with a CSI report configuration 2710, which may correspond to any of CSI report configurations 410, 1110, 1210, or 1310. The UE 104 may transmit the CSI report configuration 2710 as a RRC configuration message.

The activation component 123 at the base station 102 may transmit an activation/deactivation command 2720. The activation/deactivation command 2720 may activate or deactivate UE initiated CSI reporting. The activation/deactivation command 2720 may be a MAC-CE.

The scheduling component 124 may transmit a downlink grant 710 that schedules a PDSCH/DMRS 520. In some implementations, the downlink grant 710 may include a CSI report request.

The transmitter component 2752 may transmit the PDSCH/DMRS 520 and the CSI-RS 510.

The report receiving component 126 may receive the CSI report 550 transmitted by the UE 104.

The configuration component 141 at the UE 104 may receive the CSI report configuration 2710.

The activation component 142 at the UE 104 may receive the activation/deactivation command 2720. The activation component 142 may determine whether UE initiated CSI feedback is active based on the activation/deactivation command 2720.

The grant component 143 may receive the downlink grant 710. The grant component 143 may determine the resources for the PDSCH/DMRS 520 based on the downlink grant 710.

The measurement component 145 may perform measurements of the PDSCH/DMRS 520 and/or the CSI-RS 510 based on the CSI report configuration 2710 and the downlink grant 710.

The trigger component 144 may determine whether a CSI report has been triggered based on the downlink grant 710 and measurements of the PDSCH/DMRS 520 and/or the CSI-RS 510.

The resource component 146 may determine an uplink resource for reporting a UE initiated CSI report or a downlink grant based CSI report.

The report component 147 may generate a CSI report 550 for transmission on the uplink resource. The report component 147 may format the CSI report 550 based on the uplink resource, for example, by based a size of a CQI field. The report component 147 may determine the content of the CSI report 550. For example, the CSI report 550 may include one or more of: a CQI 2740, a RI 2742, a PMI 2744, a HARQ process number 2746, or a resource indicator 2748. The report component 147 may determine whether to drop a CSI report based on a priority of the CSI report if there is a collision between different CSI reports.

Figure 28:
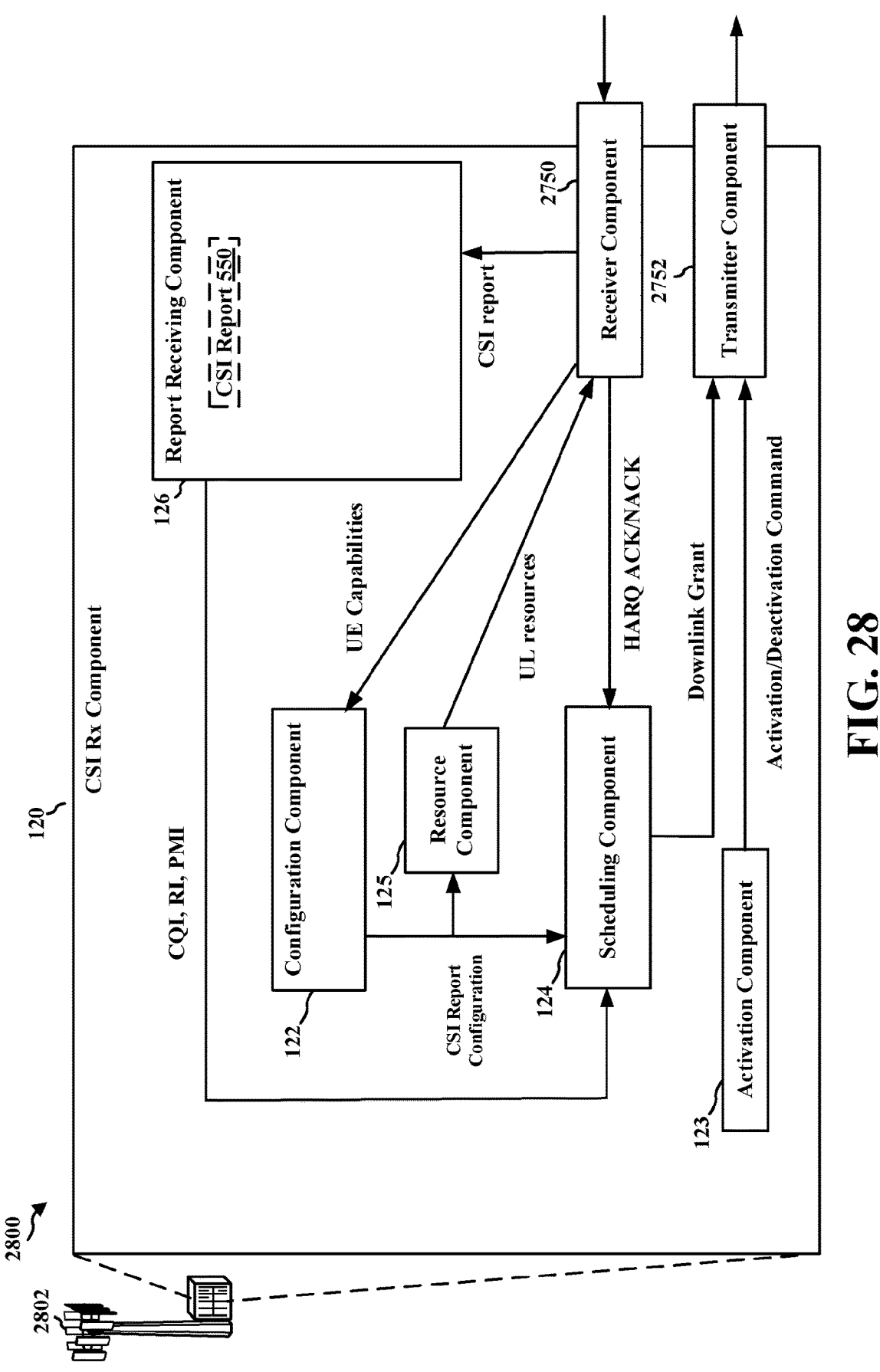
FIG. 28 is a conceptual data flow diagram illustrating the data flow between different means/components in an example base station.

FIG. 28 is a conceptual data flow diagram 2800 illustrating the data flow between different means/components in an example base station 2802, which may be an example of the base station 102 including the CSI Rx component 120.

The receiver component 2750 may receive uplink signals from the UE 104 including the CSI report 550 and the HARQ ACK/NACK 2730. In some implementations, the receiver component 2750 may receive UE capabilities. The receiver component 2750 may provide the CSI report to the report receiving component 126. The receiver component 2750 may provide the HARQ ACK/NACK 2730 to the scheduling component 124. The receiver component 2750 may provide the UE capabilities to the configuration component 122.

The report receiving component 126 may receive the CSI report from the receiver component 2750. The report receiving component 126 may extract content from the CSI report based on a format of the CSI report. For example, the report receiving component 126 may determine the CQI, RI, or PMI. The report receiving component 126 may also determine the measurement resources corresponding to the CSI report based on either the CSI report configurations or an indicator within the CSI report. The report receiving component 126 may provide the CQI, RI, and/or PMI to the scheduling component 124.

The configuration component 122 may determine one or more CSI report configurations for the UE 104. For example, the configuration component 122 may determine the CSI report configurations based on UE capabilities of the UE 104 such as a number of CPU and a number of DMRS ports. The configuration component 122 may provide the CSI report configurations to the scheduling component 124 and the resource component 125.

The resource component 125 may select reserved uplink resources on which the UE 104 may transmit a CSI report. The configuration component 122 may configure the receiver component 2750 to monitor the reserved uplink resources.

The scheduling component 124 may receive the CSI report configuration from the configuration component 122. The scheduling component 124 may receive the HARQ ACK/NACK from the receiver component 2750. The scheduling component 124 may receive the CQI, RI, and/or PMI from the report receiving component 126. The scheduling component 124 may determine the resources for transmitting the PDSCH/DMRS 520. For example, the scheduling component 124 may determine whether to transmit a retransmission or new data based on the HARQ ACK/NACK. The scheduling component 124 may determine a MCS for the PDSCH/DMRS 520 based on the CQI, RI, and/or PMI. In some implementations, the scheduling component 124 may determine whether to request a CSI report. For example, the scheduling component 124 may request a CSI report in response to a HARQ NACK. The scheduling component 124 may generate the downlink grant 710 indicating the resources for the PDSCH/DMRS 520. In some implementations, the downlink grant 710 may request a CSI report. The scheduling component 124 may transmit the downlink grant via the transmitter component 2752.

The activation component 123 may generate an activation/deactivation command 2720. For example, the activation component 123 may determine to activate UE initiated CSI feedback in response to high Doppler for the UE or based on variance in periodic CSI reports. Conversely, the activation component 123 may determine to deactivate UE initiated CSI feedback if there is little variance in periodic CSI reports or if a threshold time since a UE initiated CSI report has elapsed.

Figure 29:
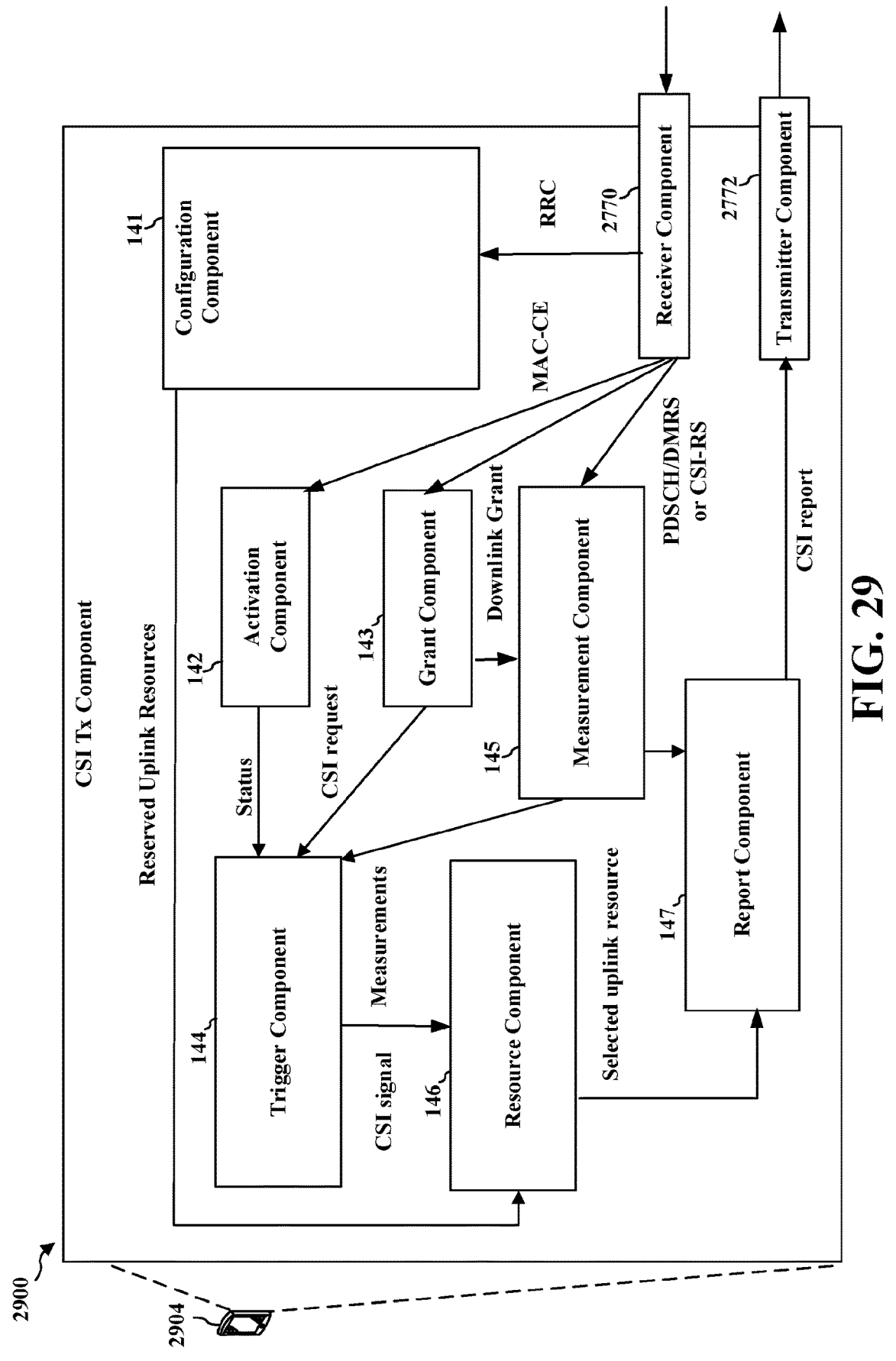
FIG. 29 is a conceptual data flow diagram illustrating the data flow between different means/components in an example UE.

FIG. 29 is a conceptual data flow diagram 2900 illustrating the data flow between different means/components in an example UE 2904, which may be an example of the UE 104 and include the CSI Tx component 140.

The receiver component 2770 may receive uplink signals such as the CSI report configuration message 2610, the activation/deactivation command 2720, the downlink grant 710, the PDSCH/DMRS 520 and the CSI-RS 510. The receiver component 2770 may provide the CSI report configuration message 2610 to the configuration component

141. The receiver component 2770 may provide the activation/deactivation command 2720 to the activation component 142. The receiver component 2770 may provide the downlink grant 710 to the grant component 143. The receiver component 2770 may provide the PDSCH/DMRS 520 and/or the CSI-RS 510 to the measurement component 145.

The configuration component 141 may receive the CSI report configuration message 2610 from the receiver component 2770. The configuration component 141 may store one or more CSI report configurations 410, 1110, 1210, 1310. The configuration component 141 may configure the measurement component 145 to measure the measurement resources based on the CSI report configuration. The configuration component 141 may also configure the resource component 146 with reserved uplink resources indicated by the CSI report configurations.

The activation component 142 may receive the activation/deactivation command 2720, which may be a MAC-CE. The activation component 142 may determine whether UE initiated CSI reporting is activated or deactivated based on the activation/deactivation command 2720. The activation component 142 may provide an activation status to the trigger component 144.

The grant component 143 may receive the downlink grant 710 from the receiver component 2770. The grant component 143 may determine whether the downlink grant 710 requests a CSI report. The grant component 143 may provide the CSI request to the trigger component 144. The grant component 143 may also provide an indication of measurement resources to the measurement component 145. In particular, the grant component 143 may indicate when the UE 104 is scheduled to receive a PDSCH/DMRS 520 to be measured for a CSI report.

The measurement component 145 may receive the signals received on the measurement resources (e.g., PDSCH/DMRS 520 or CSI-RS 510) from the receiver component 2770. The measurement component 145 may determine various measurements based on the signals received on the measurement resources. In particular, the measurement component 145 may determine a feasible MCS and/or a CQI measurement. The measurement component 145 may provide the measurements to the trigger component 144.

The trigger component 144 may determine whether to transmit a CSI report based on the CSI report configurations, the activation status, the downlink grant 710, and/or the measurements. For example, the trigger component 144 may determine to transmit a CSI report in response to the grant component 143 indicating a CSI request. As another example, the trigger component 144 may determine to transmit a CSI report in response to the activation component 142 indicating an activation status and the measurements satisfying a threshold. For instance, the trigger component 144 may determine to transmit a UE initiated CSI report when a measured spectral efficiency of the downlink measurement resource differs from a spectral efficiency indicated for the PDSCH by more than the threshold. The trigger component 144 may provide a CSI signal to the resource component 146 indicating that a CSI report is to be transmitted.

The resource component 146 may receive the reserved uplink resources from the configuration component 141. The resource component 146 may receive the CSI signal from the trigger component 144. The resource component 146 may select an uplink resource for transmission of the CSI report from the reserved uplink resources. In some implementations, where the CSI report configuration may associate a reserved uplink resource with a measurement resource or a HARQ process number, the resource component 146 may select the associated resources. In other implementations, the resource component 146 may select a next available uplink resource. The resource component 146 may provide the selected uplink resource to the report component 147.

The report component 147 may receive the measurements from the measurement component 145 and the selected uplink resource from the resource component 146. The report component 147 may generate a CSI report based on the measurements and the selected uplink resource. For example, the report component 147 may determine content of the CSI report based on a number of available bits for the selected uplink resource. The report component 147 may also determine collisions with other CSI reports and determine which CSI reports to transmit based on a priority function for each CSI report.

FIG. 30 is a flowchart of an example method 3000 for a UE report CSI. The method 3000 may be performed by a UE (such as the UE 104, which may include the memory 360 and which may be the entire UE 104 or a component of the UE 104 such as the CSI Tx component 140, TX processor 368, the RX processor 356, or the controller/processor 359). The method 3000 may be performed by the CSI Tx component 140 in communication with the CSI Rx component 120 of the base station 102. Optional blocks are shown with dashed lines.

At block 3010, the method 3000 may optionally include receiving a CSI report configuration associated with one or more resource settings that define a downlink measurement resource including a CMR. In some implementations, for example, the UE 104, the RX processor 356 or the controller/processor 359 may execute the CSI Tx component 140 or the configuration component 141 to receive, via transceiver 354, the CSI report configuration 410, 1110, 1210, or 1310 associated with one or more resource settings 1120, 1130, 1140, 1150 that define a downlink measurement resource including a CMR 420. For example, the CMR may be either a NZP-CSI-RS resource setting or DMRS/PDSCH resource setting 1120. In some implementations, the downlink measurement resource includes one or more IMR. For example, the IMR may include one or more of a DMRS/PDSCH resource setting 1130, a NZP-CSI-RS resource setting 1140, or a CSI-IM resource setting 1150. When the IMR includes the DMRS/PDSCH resource setting 1130, the interference is the measurement from the DMRS resource elements (REs) other than the channel on which the DMRS ports are conveyed. In some implementations, the CSI report configuration defines an uplink reserved resource 1450, 1452 per CMR (FIG. 14) or per HARQ process number (FIG. 15). In some implementations, the CSI report is linked to a single uplink resource and the uplink resource can be used for DMRS/PDSCH associated with any HARQ process number, e.g., the uplink resource can be used for process number 1, or process number 2. But the UE needs to report the HARQ process number together with the CSI report; otherwise the base station may not determine which DMRS is associated with the CSI report. Accordingly, the UE 104, the RX processor 356, or the controller/processor 359 executing the CSI Tx component 140 or the configuration component 141 may provide means for receiving a CSI report configuration associated with one or more resource settings that define a downlink measurement resource including a CMR.

At block 3020, the method 3000 may include receiving a command indicating that UE initiated CSI reporting based on the measurement is activated. In some implementations, for example, the UE 104, the RX processor 356 or the controller/processor 359 may execute the CSI Tx component 140 or the activation component 142 to receive, via transceiver 354, a command (e.g., activation/deactivation command 2720) indicating that UE initiated CSI reporting based on the measurement is activated. In some implementations, the command is a MAC-CE. In some implementations, the UE initiated CSI reporting based on the measurement remains active until a deactivation command is received. In some implementations, the UE initiated CSI reporting based on the measurement remains active for a number of CSI transmission opportunities. For instance, the number of CSI transmission opportunities may be defined by an RRC configuration message or defined in a standards document or regulation. Accordingly, the UE 104, the RX processor 356, or the controller/processor 359 executing the CSI Tx component 140 or the activation component 142 may provide means for receiving a command indicating that UE initiated CSI reporting based on the measurement is activated.

At block 3030, the method 3000 may include receiving a downlink grant scheduling a PDSCH and a DMRS. In some implementations, for example, the UE 104, the RX processor 356 or the controller/processor 359 may execute the CSI Tx component 140 or the grant component 143 to receive, via transceiver 354, the downlink grant 710 scheduling the PDSCH/DMRS 520. Accordingly, the UE 104, the RX processor 356, or the controller/processor 359 executing the CSI Tx component 140 or the grant component 143 may provide means for receiving a downlink grant scheduling a PDSCH and a DMRS.

At block 3040, the method 3000 may include determining to report a CSI in response to a measurement of the downlink measurement resource or in response to the downlink grant requesting the CSI. In some implementations, for example, the UE 104, the TX processor 368 or the controller/processor 359 may execute the CSI Tx component 140 or the trigger component 144 to determine to report a CSI (e.g., CSI report 550) in response to a measurement of the downlink measurement resource or in response to the downlink grant 710 requesting the CSI. In some implementations, at sub-block 3042, the block 3040 may include determining that a measured spectral efficiency satisfies a threshold. In some implementations, at sub-block 3044, the block 3040 may include determining to report the CSI when the measured spectral efficiency of the downlink measurement resource differs from a spectral efficiency indicated for the PDSCH by more than the threshold. For example, the measured spectral efficiency may be one of a CQI or a measured feasible MCS. The measured the spectral efficiency may be based on a transmission rank, a precoding matrix index, or a combination thereof. In some implementations, in sub-block 3046, the block 3040 may include determining to report the CSI in response to determining to transmit a NACK for the PDSCH. Accordingly, the UE 104, the TX processor 368, or the controller/processor 359 executing the CSI Tx component 140 or the trigger component 144 may provide means for determining to report a CSI in response to a measurement of the downlink measurement resource or in response to the downlink grant requesting the CSI.

At block 3050, the method 3000 may include determining a reserved uplink resource on which to report the CSI. In some implementations, for example, the UE 104, the TX processor 368 or the controller/processor 359 may execute the CSI Tx component 140 or the resource component 146 to determine a reserved uplink resource on which to report the CSI. In some implementations, the reserved uplink resource includes a PUCCH resource or a PUSCH resource selected from a list of reserved PUSCH resources or PUCCH resources configured by a RRC message. The selection may be determined based on an indication received in a DCI or a RRC message or based on a report ID, resource ID, or HARQ process number. In some implementations, reserved uplink resource includes a dedicated SR resource according to a periodicity and offset. In some implementations, the reserved uplink resource further includes a PUCCH resource defined by an offset from the dedicated SR. In some implementations, the reserved uplink resource is a dedicated two-step random access resource. The CSI may be carried in a msgA payload on a physical uplink PUSCH portion of the two-step random access resource. Accordingly, the UE 104, the TX processor 368, or the controller/processor 359 executing the CSI Tx component 140 or the resource component 146 may provide means for determining a reserved uplink resource on which to report the CSI.

At block 3060, the method 3000 may include transmitting a CSI report on the reserved uplink resource. In some implementations, for example, the UE 104, the RX processor 356 or the controller/processor 359 may execute the CSI Tx component 140 or the report component 147 to transmit, via transceiver 354, a CSI report 550 on the reserved uplink resource. In some implementations, the CSI report includes a HARQ process number of the PDSCH (e.g., where the reserved uplink resource is not mapped to a HARQ process number). In some implementations, the downlink measurement resource is the DMRS and the CSI report includes a CQI. In some implementations, the CQI may be a single bit indicating whether a feasible CQI or MCS is less than an indicated MCS for the PDSCH by more than a threshold. In some implementations, the CQI may be a single bit, where a first codepoint of the single bit indicates that a feasible CQI or MCS is less than an indicated MCS for the PDSCH by more than a threshold and a second codepoint of the single bit indicates that the feasible CQI or MCS is greater than the indicated MCS by more than the threshold. In some implementations, the CQI indicates a 4-bit CQI value or a 2-bit CQI differential relative to an indicated MCS for the PDSCH. In some implementations, the CSI report includes a rank indicator and a value of the CQI is based on the rank indicator. In some implementations, the CSI report includes a measurement resource indicator, a PMI, a RI, a CQI, or combination thereof configured for the CSI report configuration. In some implementations, at sub-block 3062, the block 3060 may include determining a priority of the CSI based at least in part on a type of the downlink measurement resource, or whether the CSI is triggered by the UE in response to a CSI measurement, or whether an aperiodic CSI is transmitted on PUCCH. In some implementations, at sub-block 3064, the block 3060 may include determining a CSI multiplexing order, a dropping order, or an omission order based on the priority of the CSI. Accordingly, the UE 104, the RX processor 356, or the controller/processor 359 executing the CSI Tx component 140 or the report component 147 may provide means for transmitting a CSI report on the reserved uplink resource.

Figure 31:
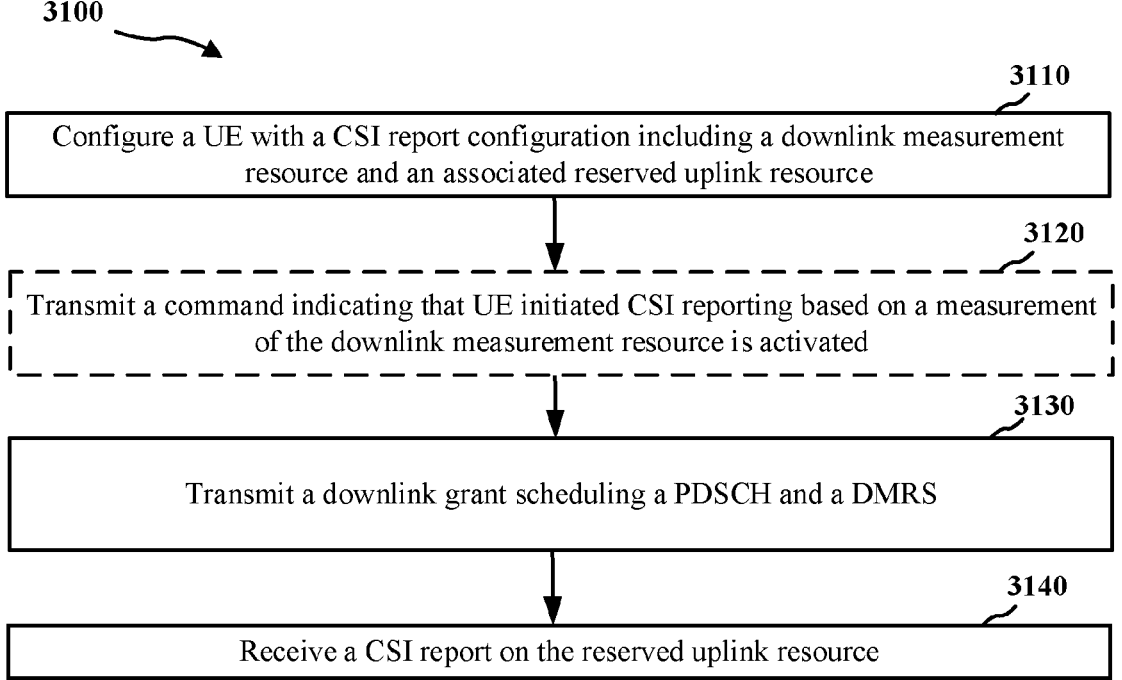
FIG. 31 is a flowchart of an example method for a base station to receive a UE initiated CSI report or a downlink grant based CSI report.

FIG. 31 is a flowchart of an example method 3100 for a base station to receive a UE initiated CSI report or a downlink grant based CSI report. The method 3100 may be performed by a base station (such as the base station 102, which may include the memory 376 and which may be the entire base station 102 or a component of the base station 102 such as the CSI Rx component 120, TX processor 316, the RX processor 370, or the controller/processor 375). The method 3100 may be performed by the CSI Rx component 120 in communication with the CSI Tx component 140 of the UE 104.

At block 3110, the method 3100 may include configuring a UE with a CSI report configuration including a downlink measurement resource and an associated reserved uplink resource. In some implementations, for example, the base station 102, the controller/processor 375, or the TX processor 316 may execute the CSI Rx component 120 or the configuration component 122 to configure a UE with a CSI report configuration including a downlink measurement resource and an associated reserved uplink resource. Accordingly, the base station 102, the controller/processor 375, or the TX processor 316 executing the CSI Rx component 120 or the configuration component 122 may provide means for configuring a UE with a CSI report configuration including a downlink measurement resource and an associated reserved uplink resource.

At block 3120, the method 3100 may optionally include transmitting a command indicating that UE initiated CSI reporting based on a measurement of the downlink measurement resource is activated. In some implementations, for example, the base station 102, the controller/processor 375, or the TX processor 316 may execute the CSI Rx component 120 or the activation component 123 to transmit, via transceiver 318, a command indicating that UE initiated CSI reporting based on a measurement of the downlink measurement resource is activated. Accordingly, the base station 102, the controller/processor 375, or the TX processor 316 executing the CSI Rx component 120 or the activation component 123 may provide means for transmitting a command indicating that UE initiated CSI reporting based on a measurement of the downlink measurement resource is activated.

At block 3130, the method 3100 may include transmitting a downlink grant scheduling a PDSCH and a DMRS. In some implementations, for example, the base station 102, the controller/processor 375, or the TX processor 316 may execute the CSI Rx component 120 or the scheduling component 124 to transmit, via transceiver 318, a downlink grant scheduling a PDSCH and a DMRS. Accordingly, the base station 102, the controller/processor 375, or the TX processor 316 executing the CSI Rx component 120 or the scheduling component 124 may provide means for transmitting a downlink grant scheduling a PDSCH and a DMRS.

At block 3140, the method 3100 may include receiving a CSI report on the reserved uplink resource. In some implementations, for example, the base station 102, the controller/processor 375, or the TX processor 316 may execute the CSI Rx component 120 or the report receiving component 126 to receive, via transceiver 318, a CSI report on the reserved uplink resource. Accordingly, the base station 102, the controller/processor 375, or the TX processor 316 executing the CSI Rx component 120 or the report receiving component 126 may provide means for receiving a CSI report on the reserved uplink resource.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:

1. A method of wireless communication, comprising, by a user equipment (UE):

receiving a downlink grant scheduling a physical downlink shared channel (PDSCH) and a demodulation reference signal (DMRS);

determining to report a channel state information (CSI) in response to a measurement of a downlink measurement resource or in response to the downlink grant requesting the CSI;

determining a reserved uplink resource on which to report the CSI; and transmitting a CSI report on the reserved uplink resource.

2. The method of clause 1, wherein determining to report the CSI in response to the measurement comprises determining that a measured spectral efficiency satisfies a threshold.

3. The method of clause 2, wherein determining that the measured spectral efficiency satisfies the threshold comprises determining to report the CSI when the measured spectral efficiency of the downlink measurement resource differs from a spectral efficiency indicated for the PDSCH by more than the threshold.

4. The method of clause 2 or 3, wherein the measured spectral efficiency is one of a channel quality indicator (CQI) or a measured feasible modulation and coding scheme (MCS).

5. The method of any of clauses 2-4, wherein the spectral efficiency is also based on a transmission rank, a precoding matrix index, or a combination thereof.

6. The method of any of clauses 1-5, further comprising receiving a command indicating that UE initiated CSI reporting based on the measurement is activated.

7. The method of clause 6, wherein the command is a media access control (MAC) control element (CE).

8. The method of clause 6 or 7, wherein the UE initiated CSI reporting based on the measurement remains active until a deactivation command is received.

9. The method of clause 6 or 7, wherein the UE initiated CSI reporting based on the measurement remains active for a number of CSI transmission opportunities.

10. The method of any of clauses 1-9, further comprising receiving a CSI report configuration associated with one or more resource settings that define the downlink measurement resource including a channel measurement resource (CMR), wherein the CMR is either a NZP-CSI-RS resource setting or a DMRS or PDSCH (DMRS/PDSCH) resource setting.

11. The method of clause 10, wherein the downlink measurement resource includes one or more interference measurement resources (IMR) selected from the group consisting of: a DMRS/PDSCH resource, a non-zero power (NZP) CSI reference signal (NZP-CSI-RS), and a CSI-RS resource for interference measurement (CSI-IM).

12. The method of clause 11, wherein the IMR is the DMRS/PDSCH resource and the interference is the measurement from DMRS resource elements (REs) or PDSCH REs other than a channel on which a set of DMRS ports for the PDSCH is conveyed or a channel on which the PDSCH is conveyed.

13. The method of any of clauses 10-12, wherein the CSI report configuration defines a reserved uplink resource per CMR or per hybrid automatic repeat request (HARQ) process number.

14. The method of any of clauses 10-13, wherein the CSI report configuration defines an uplink resource for each of the one or more resource settings.

15. The method of clause 14, wherein the CSI report configuration is associated with a single DMRS/PDSCH CMR or single HARQ process number.

16. The method of clause 14, wherein the CSI report includes a HARQ process number of the PDSCH.

17. The method of any of clauses 10-16, wherein the CSI report includes a measurement resource indicator, precoding matrix indicator (PMI), rank indicator (RI), channel quality indicator (CQI), or combination thereof configured for the CSI report configuration.

18. The method of any of clauses 1-17, wherein the downlink measurement resource is the DMRS and the CSI report includes a channel quality indicator (CQI).

19. The method of clause 18, wherein the CQI is a single bit indicating whether a feasible CQI or MCS is less than an indicated MCS for the PDSCH by more than a threshold.

20. The method of clause 18, wherein the CQI is a single bit, where a first codepoint of the single bit indicates that a feasible CQI or MCS is less than an indicated MCS for the PDSCH by more than a threshold and a second codepoint of the single bit indicates that the feasible CQI or MCS is greater than the indicated MCS by more than the threshold.

21. The method of clause 18, wherein the CQI indicates a 4-bit CQI value or a 2-bit CQI differential relative to an indicated MCS for the PDSCH.

22. The method of clause 21, wherein the CSI report includes a rank indicator and a value of the CQI is based on the rank indicator.

23. The method of any of clauses 1-22, wherein the reserved uplink resource includes a physical uplink control channel (PUCCH) resource or a physical uplink shared channel (PUSCH) resource selected from a list of reserved PUSCH resources or PUCCH resources configured by a radio resource control (RRC) message, and wherein the selection is determined based on an indication received in downlink control information (DCI) or a RRC message or based on a report ID, resource ID, or HARQ process number.

24. The method of any of clauses 1-23, wherein the reserved uplink resource includes a dedicated scheduling request (SR) resource according to a periodicity and offset.

25. The method of clause 24, wherein the reserved uplink resource further includes a PUCCH resource defined by an offset from the dedicated SR resource.

26. The method of any of clauses 1-22, wherein the reserved uplink resource is a dedicated two-step random access\resource, wherein the CSI is carried in a msgA payload on a physical uplink PUSCH.

27. The method of any of clauses 1-26, wherein determining to report the CSI is also in response to determining to transmit a negative acknowledgment (NACK) for the PDSCH.

28. The method of any of clause 1-27, wherein the downlink measurement resource is the DMRS, the PDSCH, or a combination thereof and a reference resource for CQI reporting is a slot in which the DMRS or the PDSCH is received.

29. The method of clause 28, wherein a CSI processing unit (CPU) occupation time starts from a first symbol of an earliest of the DMRS or the PDSCH used for channel measurement or an interference measurement resource and ends at a last symbol of the reserved uplink resource.

30. The method of clause 28 or 29, wherein a DMRS port for the DMRS and the PDSCH is active from a first symbol of the DMRS or the PDSCH used for channel measurement or interference measurement to a last symbol of the reserved uplink resource.

31. The method of any of clauses 1-30, wherein the reserved uplink resource is separated from a last symbol of the downlink measurement resource by at least a number of symbols defined by a CSI timeline, wherein the CSI timeline is selected based at least in part on a number of CPU occupation or a number of a DMRS port.

32. The method of clause 31, wherein the reserved uplink resource is separated from a last symbol of the downlink measurement resource by a greater of the number of symbols defined by the CSI timeline or a number of symbols defined by a HARQ timeline when the CSI is transmitted on a same slot as a HARQ ACK/NACK or in a same PUCCH as the HARQ ACK/NACK.

33. The method of any of clauses 1-32, wherein transmitting the CSI report on the reserved uplink resource comprises:

determining a priority of the CSI based at least in part on a type of the downlink measurement resource, whether the CSI is triggered by the UE in response to a CSI measurement, or whether an aperiodic CSI is transmitted on a physical uplink control channel (PUCCH); and determining a CSI multiplexing order, a dropping order, or an omission order based on the priority of the CSI.

34. An apparatus for wireless communication, comprising:

a memory storing computer-executable instructions;

a transceiver; and a processing system coupled to the memory and the transceiver and configured to execute the instructions to perform the method of any of clauses 1-33.

35. An apparatus for wireless communication, comprising means for performing the method of any of clauses 1-33.

36. A non-transitory computer-readable medium storing computer executable code, the code when executed by a processor causes the processor to perform the method of any of clauses 1-33.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising, by a user equipment (UE):
   receiving a downlink grant scheduling a physical downlink shared channel (PDSCH) and a demodulation reference signal (DMRS);
   determining to report a channel state information (CSI) in response to a measurement of a downlink measurement resource when a measured spectral efficiency of the downlink measurement resource differs from a spectral efficiency indicated for the PDSCH by more than a threshold;
   determining a reserved uplink resource on which to report the CSI; and
   transmitting a CSI report on the reserved uplink resource.

2. The method of claim 1, wherein the measured spectral efficiency is one of a channel quality indicator (CQI) or a measured feasible modulation and coding scheme (MCS).

3. The method of claim 1, further comprising receiving a command indicating that UE initiated CSI reporting based on the measurement is activated.

4. The method of claim 3, wherein the UE initiated CSI reporting based on the measurement remains active until a deactivation command is received or for a number of CSI transmission opportunities.

5. The method of claim 1, further comprising receiving a CSI report configuration associated with one or more resource settings that define the downlink measurement resource including a channel measurement resource (CMR), wherein the CMR is either a NZP-CSI-RS resource setting or a DMRS or PDSCH (DMRS/PDSCH) resource setting.

6. The method of claim 5, wherein the downlink measurement resource includes one or more interference measurement resources (IMR) selected from the group consisting of: a DMRS/PDSCH resource, a non-zero power (NZP) CSI reference signal (NZP-CSI-RS), and a CSI-RS resource for interference measurement (CSI-IM).

7. The method of claim 5, wherein the CSI report configuration defines the reserved uplink resource per CMR or per hybrid automatic repeat request (HARQ) process number.

8. The method of claim 5, wherein the CSI report configuration defines an uplink resource for each of the one or more resource settings.

9. The method of claim 8, wherein the CSI report configuration is associated with a single DMRS/PDSCH CMR or single HARQ process number.

10. The method of claim 8, wherein the CSI report includes a HARQ process number of the PDSCH.

11. The method of claim 1, wherein the downlink measurement resource is the DMRS and the CSI report includes a channel quality indicator (CQI).

12. The method of claim 11, wherein the CQI is a single bit indicating whether a feasible CQI or MCS is less than an indicated MCS for the PDSCH by more than a threshold.

13. The method of claim 11, wherein the CQI is a single bit, where a first codepoint of the single bit indicates that a feasible CQI or MCS is less than an indicated MCS for the PDSCH by more than a threshold and a second codepoint of the single bit indicates that the feasible CQI or MCS is greater than the indicated MCS by more than the threshold.

14. The method of claim 11, wherein the CQI indicates a 4-bit CQI value or a 2-bit CQI differential relative to an indicated MCS for the PDSCH.

15. The method of claim 14, wherein the CSI report includes a rank indicator and a value of the CQI is based on the rank indicator.

16. An apparatus for wireless communication, comprising:
   a memory storing computer-executable instructions;
   a transceiver; and
   a processing system coupled to the memory and the transceiver and configured to execute the instructions to:
      receive, via the transceiver, a downlink grant scheduling a physical downlink shared channel (PDSCH) and a demodulation reference signal (DMRS);
      determine to report a channel state information (CSI) in response to a measurement of a downlink measurement resource when a measured spectral efficiency of the downlink measurement resource differs from a spectral efficiency indicated for the PDSCH by more than a threshold;
      determine a reserved uplink resource on which to report the CSI; and
      transmit, via the transceiver, a CSI report on the reserved uplink resource.

17. The apparatus of claim 16, wherein the measured spectral efficiency is one of a channel quality indicator (CQI) or a measured feasible modulation and coding scheme (MCS).

18. The apparatus of claim 16, wherein the processing system is configured to receive, via the transceiver, a command indicating that UE initiated CSI reporting based on the measurement is activated.

19. The apparatus of claim 18, wherein the processing system is configured to keep the UE initiated CSI reporting based on the measurement activated until a deactivation command is received or for a number of CSI transmission opportunities.

20. The apparatus of claim 16, wherein the processing system is configured to receive a CSI report configuration associated with one or more resource settings that define the downlink measurement resource including a channel measurement resource (CMR), wherein the CMR is either a NZP-CSI-RS resource setting or a DMRS or PDSCH (DMRS/PDSCH) resource setting.

21. The apparatus of claim 20, wherein the downlink measurement resource includes one or more interference measurement resources (IMR) selected from the group consisting of: a DMRS/PDSCH resource, a non-zero power (NZP) CSI reference signal (NZP-CSI-RS), and a CSI-RS resource for interference measurement (CSI-IM).

22. The apparatus of claim 20, wherein the CSI report configuration defines an uplink resource for each of the one or more resource settings.

23. The apparatus of claim 16, wherein the downlink measurement resource is the DMRS and the CSI report includes a channel quality indicator (CQI).

24. The apparatus of claim 16, wherein the processing system is configured to receive a CSI report configuration that defines the reserved uplink resource per channel measurement resource (CMR) or per hybrid automatic repeat request (HARQ) process number.

25. An apparatus for wireless communication, comprising:

means for receiving a downlink grant scheduling a physical downlink shared channel (PDSCH) and a demodulation reference signal (DMRS);

means for determining to report a channel state information (CSI) in response to a measurement of a downlink measurement resource when a measured spectral efficiency of the downlink measurement resource differs from a spectral efficiency indicated for the PDSCH by more than a threshold;

means for determining a reserved uplink resource on which to report the CSI; and means for transmitting a CSI report on the reserved uplink resource.

26. The apparatus of claim 25, further comprising means for receiving a command indicating that UE initiated CSI reporting based on the measurement is activated.

27. The apparatus of claim 25, further comprising means for receiving a CSI report configuration associated with one or more resource settings that define the downlink measurement resource including a channel measurement resource (CMR), wherein the CMR is either a NZP-CSI-RS resource setting or a DMRS or PDSCH (DMRS/PDSCH) resource setting.

28. The apparatus of claim 25, further comprising means for receiving a CSI report configuration that defines the reserved uplink resource per channel measurement resource (CMR) or per hybrid automatic repeat request (HARQ) process number.

29. A non-transitory computer-readable medium storing computer executable code, the code when executed by a processor causes the processor to:

receive a downlink grant scheduling a physical downlink shared channel (PDSCH) and a demodulation reference signal (DMRS);

determine to report a channel state information (CSI) in response to a measurement of a downlink measurement resource when a measured spectral efficiency of the downlink measurement resource differs from a spectral efficiency indicated for the PDSCH by more than a threshold;

determine a reserved uplink resource on which to report the CSI; and transmit a CSI report on the reserved uplink resource.

30. The non-transitory computer-readable medium of claim 29, further comprising code to receive a CSI report configuration that defines the reserved uplink resource per channel measurement resource (CMR) or per hybrid automatic repeat request (HARQ) process number.

* * * * *